(12) United States Patent
Saeki

(10) Patent No.: US 6,336,025 B1
(45) Date of Patent: Jan. 1, 2002

(54) INTERMEDIATE TRANSFER BELT, METHOD OF PRODUCING INTERMEDIATE TRANSFER BELT, AND IMAGE FORMING APPARATUS USING THE SAME INTERMEDIATE TRANSFER BELT

(75) Inventor: Kazuchika Saeki, Iwatsuki (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/671,656

(22) Filed: Sep. 28, 2000

(30) Foreign Application Priority Data

Sep. 28, 1999 (JP) .......................................... 11-274337
Aug. 10, 2000 (JP) .......................................... 12-242180

(51) Int. Cl.⁷ ..................... B29C 41/04; G03G 15/00; G03G 15/16
(52) U.S. Cl. ..................... 399/301; 156/137; 399/302; 399/308; 264/311
(58) Field of Search .................. 399/301, 302, 399/308; 156/137, 140; 264/311

(56) References Cited

U.S. PATENT DOCUMENTS 5,219,505 A * 6/1993 Kaiser ..................... 156/104 X
5,802,442 A * 9/1998 Konno et al. ................ 399/308
6,101,360 A * 8/2000 Hara et al. .................. 399/308
6,278,858 B1 * 8/2001 Nakazawa et al. .......... 399/302

FOREIGN PATENT DOCUMENTS

| JP | 5-11562 | 1/1993 |
| JP | 5-158314 | 6/1993 |
| JP | 9-54476 | 2/1997 |
| JP | 10-268663 | * 10/1998 |
| JP | 11-73036 | 3/1999 |
| JP | 2000-10418 | 1/2000 |
| JP | 2000-218637 | * 8/2000 |

* cited by examiner

Primary Examiner—Fred L. Braun

(57) ABSTRACT

A method of producing an endless intermediate transfer belt having at least one position detecting hole for detecting a rotational position of the endless intermediate transfer belt in an image forming apparatus, including rotating a cylindrical mold having at least one protruding member on an inner peripheral surface thereof, supplying a liquid material onto the inner peripheral surface of the cylindrical mold wherein the liquid material is formed into the endless intermediate transfer belt and the at least one position detecting hole is formed in the endless intermediate transfer belt by the at least one protruding member, heating the endless intermediate transfer belt so as to harden the endless intermediate transfer belt, and taking out the endless intermediate transfer belt from the cylindrical mold.

31 Claims, 15 Drawing Sheets

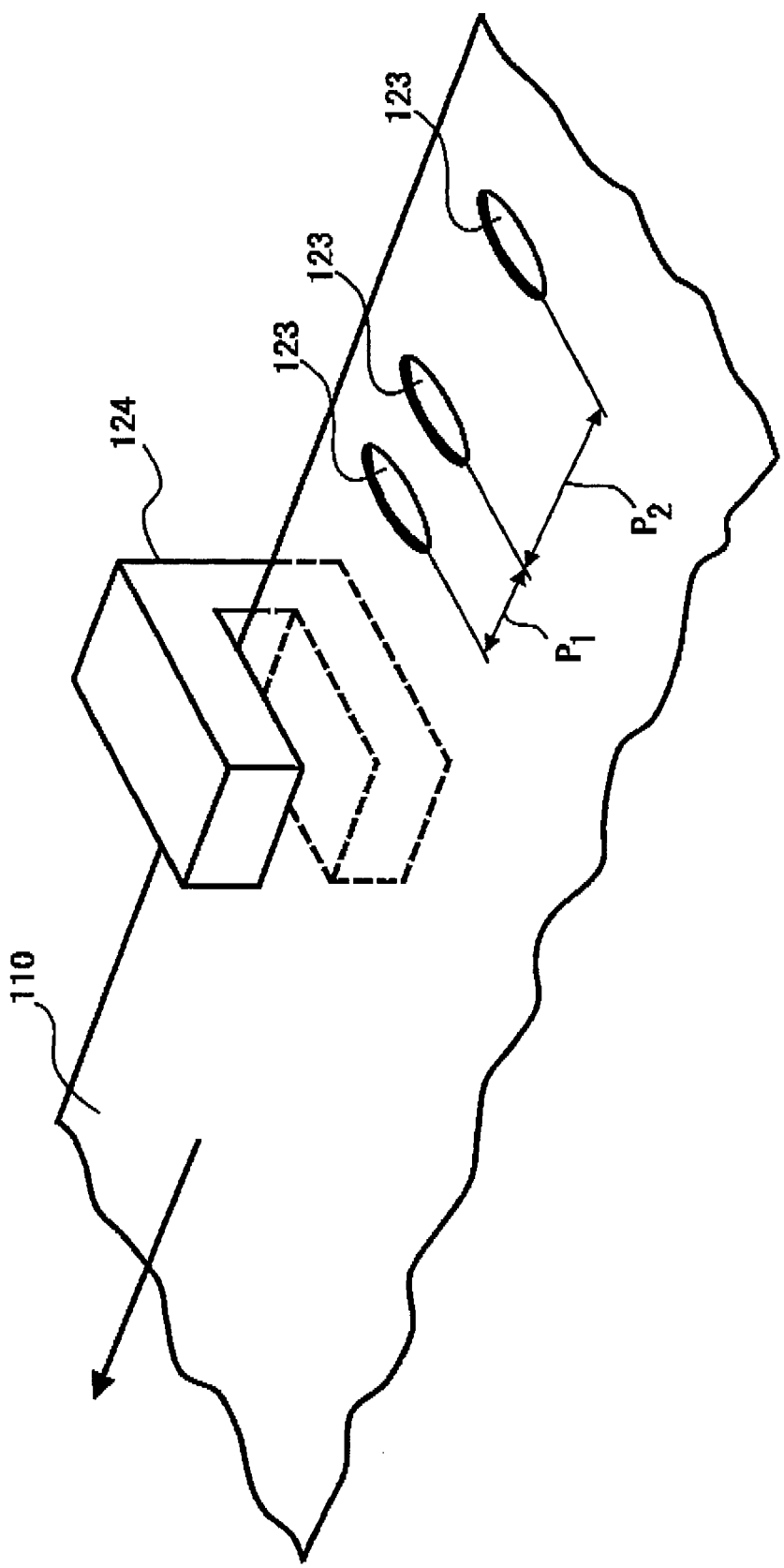

INTERMEDIATE TRANSFER BELT, METHOD OF PRODUCING INTERMEDIATE TRANSFER BELT, AND IMAGE FORMING APPARATUS USING THE SAME INTERMEDIATE TRANSFER BELT

CROSS-REFERENCE TO RELATED APPLICATIONS

The present application claims priority under 35 U.S.C. §119 to Japanese Patent Application No. 11-274337 filed on Sep. 28, 1999 and Japanese Patent Application No. 2000-242180 filed on Aug. 10, 2000. The contents of these applications are incorporated herein by reference in their entirety.

BACKGROUND OF THE INVENTION

1. Field of the Invention

The present invention relates to an intermediate transfer belt for an image forming apparatus employing an electrophotographic method such as a photocopier, a printer, a facsimile, and similar image forming apparatus, and more particularly, to a method of producing the intermediate transfer belt for the image forming apparatus.

2. Discussion of the Background

In a known image forming apparatus employing an electrophotographic method, to form a toner image on a transfer material, first, an electrostatic latent image is formed on a surface of a photoreceptor including photoconductive element serving as a first image bearing member by a latent image forming device including a charging device, an exposing device, etc. Subsequently, the electrostatic latent image on the photoreceptor is developed with toner by a developing device, and then the toner image is transferred to the transfer material serving as a second image bearing member by a transfer device including a transfer charger, a transfer roller, etc. The transferred toner image is fixed on the transfer material under the influence of heat and pressure by a fusing device including a fusing roller, a pressure roller, etc., and thereby a print image is obtained.

Further, as a full-color image forming method, there are, for example, two types of known image forming methods.

In the first type full-color image forming method, first, a latent image forming device forms an electrostatic latent image corresponding to each color component image obtained by separating an original image into each color component image on a photoreceptor. Each electrostatic latent image is developed with a corresponding color toner such as yellow, magenta, cyan, and black toners which are respectively deposited in developing units. Then, under the condition that a transfer material is held on a transfer material bearing member such as a transfer drum, yellow, magenta, cyan, and black toner images formed on the photoreceptor are transferred onto the transfer material by each color by a transfer device such that respective color toner images are superimposed on each other on the transfer material. Subsequently, the transfer material is separated from the transfer material bearing member. The toner image transferred onto the transfer material is fixed by a fixing device, and thereby a full-color image is obtained.

On the other hand, for example, Japanese Laid-open Patent Publication No. 5-11562 describes a multi-color image forming apparatus employing the second type full-color image forming method wherein respective color toner images developed on a photoreceptor are not directly transferred onto a transfer material. Specifically, color toner images developed on the photoreceptor are transferred onto an intermediate transfer member that rotates in synchronization with the rotations of the photoreceptor by each color by a primary transfer device (transfer from the photoreceptor to the intermediate transfer member may be hereinafter referred to as a primary transfer). The transferred color toner images are superimposed on each other on the intermediate transfer member. Subsequently, the toner image is collectively transferred onto the transfer material which is conveyed in synchronization with the rotations of the intermediate transfer member by a secondary transfer device (transfer from the intermediate transfer member to the transfer material may be hereinafter referred to as a secondary transfer). The toner image transferred onto the transfer material is fixed by a fixing device, and thereby a full-color image is obtained.

In an image forming apparatus employing the above-described second type full-color image forming method wherein the intermediate transfer member is used, there is no need for any control on the transfer material, such as, for example, attaching the transfer material onto the surface of the transfer material bearing member, curving the transfer material along the surface of the transfer material bearing member, etc., as compared with the above-described first type full-color image forming method. Therefore, in the image forming apparatus employing the second type full-color image forming method, various kinds of transfer materials can be used regardless of thickness, width, length, etc., such as from a thin paper of about 40 g/m$^2$ to a thick paper of about 200 g/m$^2$, a post card, an envelope, etc. Thus, the second type full-color image forming method has an advantage in versatility in transfer materials.

Although the image forming apparatus using the intermediate transfer member has the above-described advantage in versatility in transfer materials, it has the following problems to be solved.

With the increase of operations of color electrophotographic apparatuses such as a color copier, a color laser printer, etc. in the market, there has been increase in users' demands for high image quality. Generally, as a background intermediate transfer member, intermediate transfer belts made of resin and produced by an extrusion method have been being much employed. However, in the intermediate transfer belt produced by the extrusion method, transfer unevenness typically occurs due to nonuniformity in resistivity of the intermediate transfer belt in the circumferential direction thereof.

It is assumed that the nonuniform resistivity of the intermediate transfer belt in the circumferential direction thereof is caused by the following reason. In the extrusion method, molten resin materials are injected from a plurality of nozzles into a mold of an extrusion molding device. Then, the resin materials injected from the nozzles are extruded by the mold. When the resin materials are extruded by the mold, the difference in pressure received by the resin materials in the circumferential direction thereof may occur. As a result, a dispersive condition of electrically conductive filler such as carbon black, etc. may be changed, and thereby the resistivity in the intermediate transfer belt in the circumferential direction thereof may turn out to be nonuniform.

Thus, in the image forming apparatus using the intermediate transfer belt produced by the extrusion method, the transfer unevenness which may be caused by the nonuniform resistivity in the intermediate transfer belt in the rotational direction thereof typically occurs.

Also, in intermediate transfer belts produced by a dipping method and an injection molding method, resistivity of the intermediate transfer belts become nonuniform due to uneven dispersion of the electrically conductive filler.

In the above-described intermediate transfer belt, in order to prevent deviation of the position of multi-color toner images which are transferred from the photoreceptor onto the intermediate transfer belt, a position detecting mark is provided so as to detect a rotational position of the intermediate transfer belt and to make transfer starting timings of respective color toner images coincide with each other. For example, in the background image forming apparatus, a reflecting tape is affixed onto a rear surface or a front surface of the intermediate transfer belt as the position detecting mark. A light-reflecting type mark sensor detects the reflecting tape.

The position detecting mark is used as a reference when respective color toner images are sequentially transferred onto the intermediate transfer belt and superimposed on each other. If the position detecting mark is affixed onto the intermediate transfer belt without high accuracy, the position of the transferred color toner images is deviated on the intermediate transfer belt. This deteriorates an image quality of the full-color image transferred onto a transfer material.

Further, in the case of the intermediate transfer belt using the above-described reflecting tape as the position detecting mark, the reflecting tape as a position detecting member and equipment for affixing the reflecting tape to the intermediate transfer belt are required. Moreover, troublesome processing works of affixing the reflecting tape to the intermediate transfer belt is required. As a result, the manufacturing cost is inevitably increased.

Furthermore, in the image forming apparatus using the intermediate transfer belt on which the above-described reflecting tape is affixed, when the intermediate transfer belt is repeatedly rotated, the reflecting tape may be separated from the intermediate transfer belt or may curl up. Consequently, the rotational position of the intermediate transfer belt can not be detected accurately, and thereby primary transfer errors may occur. Therefore, an image forming operation can not be performed properly.

Still furthermore, the position of the reflecting tape affixed on the intermediate transfer belts is likely to be nonuniform. Accordingly, errors in detecting the position of the intermediate transfer belt may be caused.

As an alternative method of detecting the position of the intermediate transfer belt without affixing the above-described reflecting tape onto the intermediate transfer belt, a method using a position detecting hole is known. Specifically, as illustrated in FIG. 21, a slit-shaped position detecting hole 123 is provided at somewhat inside from the one edge of an intermediate transfer belt 110. A mark sensor 124 of light-transmission type detects the position detecting hole 123 as a position detecting mark. For example, Japanese Laid-open Patent Publication No. 5-158314 describes a similar method using slit-shaped position detecting holes.

The slit-shaped position detecting hole 123 is usually formed by making holes through the portion near one edge of the intermediate transfer belt 110 after the intermediate transfer belt 110 is formed in a shape of an endless belt. Accordingly, in a boring process for the position detecting hole 123, the position of the position detecting hole 123 is likely to be nonuniform in the intermediate transfer belt 110. Therefore, similarly as in the above-described intermediate transfer belt using the reflecting tape as the position detecting mark, errors in detecting the rotational position of the intermediate transfer belt 110 are likely to occur in the intermediate transfer belt 110 using the position detecting hole 123 as the position detecting mark. Further, after the position detecting hole 123 is formed in the intermediate transfer belt 110 in the boring process, residue as a waste is unfavorably produced.

The above-described errors in detecting the rotational position of the intermediate transfer belt 110 are likely to occur especially when a plurality of position detecting holes 123 are formed in the intermediate transfer belt 110. When a plurality of position detecting holes 123 are formed in the intermediate transfer belt 110 as illustrated in FIG. 21, three detection signals are sequentially output from the mark sensor 124 at a timing corresponding to a pitch P1 and a pitch P2 between respective position detecting holes 123. The rotational position of the intermediate transfer belt 110 is detected based on the detection signals output from the mark sensor 124. Therefore, the degree of accuracy for detecting the rotational position of the intermediate transfer belt 110 depends on the accuracy of the pitches P1 and P2.

In such a situation, regarding the pitches P1 and P2 between the respective position detecting holes 123, it is required to form the position detecting holes 123 such that, for example, the pitches P1 and P2 usually fall within the tolerance of ±3 mm.

However, the respective position detecting holes 123 are formed by boring them in order with a predetermined pitch so as to go along in the rotational direction of the intermediate transfer belt 110. Consequently, even though the pitches between the position detecting holes 123 which are located adjacent to each other fall within the above-described tolerance range, those pitches between the position detecting hole 123 bored first and that bored last may inevitably deviate from the above-described tolerance range due to the accumulation of tolerance therebetween.

For this reason, in the intermediate transfer belt 110 wherein the above-described position detecting holes 123 are formed in the boring process, errors in detecting the rotational position of the intermediate transfer belt 110 occur due to the low accuracy of the pitches P1 and P2 between the respective position detecting holes 123. For example, when the position detecting hole 123 bored first and that bored last are formed extraordinary close to each other due to the above-described accumulation of the tolerance, those two position detecting holes 123 are detected such that the two detection signals output from the mark sensor 124 are sometimes superposed on each other.

In this case, it may be impossible to judge which one of the two position detecting holes 123 is detected based on the detection signal output from the mark sensor 124. As a result, the rotational position of the intermediate transfer belt 110 can not be detected precisely.

SUMMARY OF THE INVENTION

The present invention has been made in view of the above-discussed and other problems.

According to the present invention, a novel method of producing a high quality intermediate transfer belt allows an intermediate transfer belt whose position can be detected with high accuracy to be produced at a low cost.

Also, according to the present invention, a novel intermediate transfer belt of high quality for an image forming apparatus allows a position of the intermediate transfer belt to be detected precisely so as to form a high quality image.

Still, according to the present invention, a novel image forming apparatus including a high quality intermediate transfer belt allows a position of the intermediate transfer belt to be detected precisely so as to form a high quality image.

These and other objects can be achieved according to the present invention by a novel method of producing an endless intermediate transfer belt having at least one position detecting hole for detecting a rotational position of the endless intermediate transfer belt in an image forming apparatus, including rotating a cylindrical mold having at least one protruding member on an inner peripheral surface thereof, supplying a liquid material onto the inner peripheral surface of the cylindrical mold wherein the liquid material is formed into the endless intermediate transfer belt and the at least one position detecting hole is formed in the endless intermediate transfer belt by the at least one protruding member, and heating the endless intermediate transfer belt so as to harden the endless intermediate transfer belt, and taking out the endless intermediate transfer belt from the cylindrical mold.

Other objects, features, and advantages according to the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 21 is an enlarged view illustrating a background intermediate transfer belt.

DESCRIPTION OF THE PREFERRED EMBODIMENTS

Figure 1:
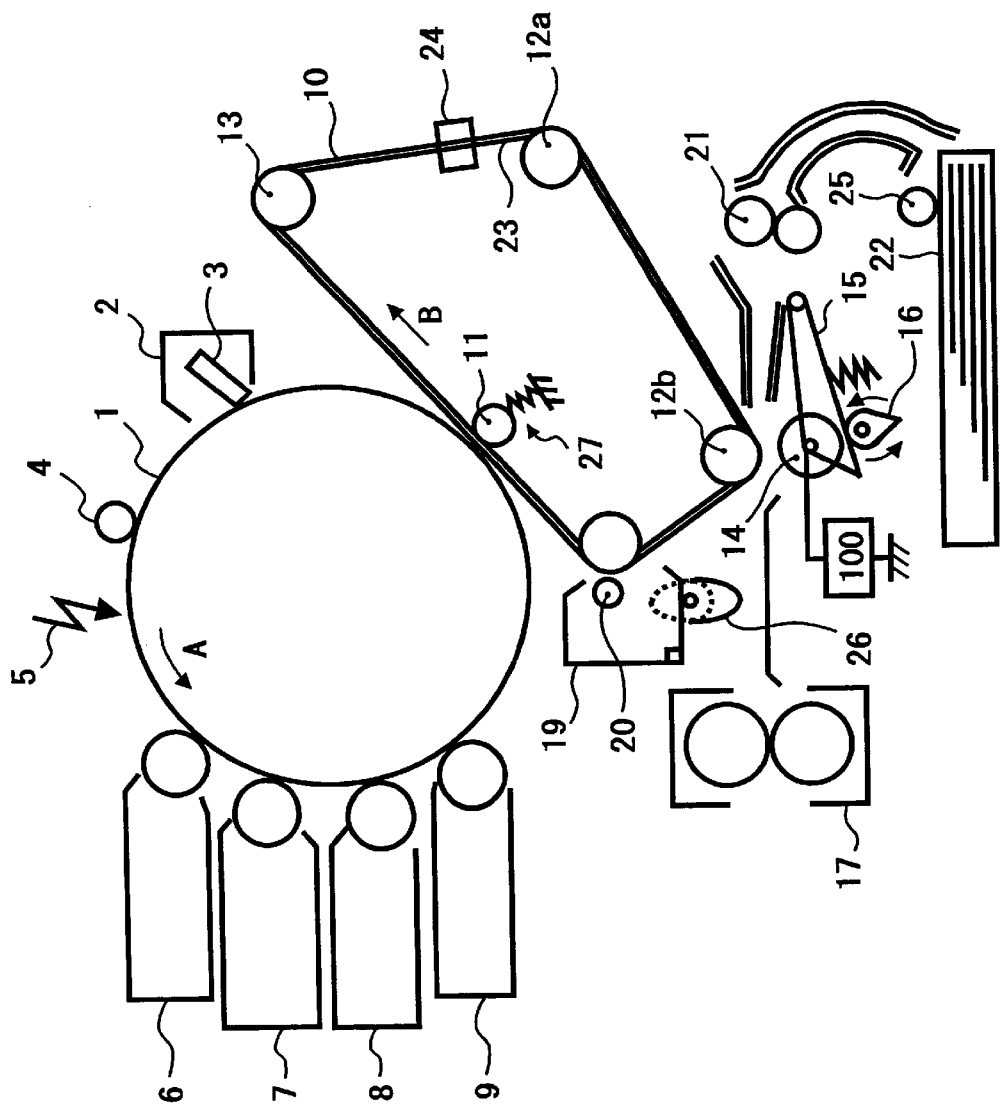
FIG. 1 is a schematic view illustrating a construction of a multi-color image forming apparatus including an intermediate transfer belt according to embodiments of the present invention.

Embodiments of the present invention are described in detail referring to the drawings, wherein like reference numerals designate identical or corresponding parts throughout the several views.

FIG. 1 is a schematic view illustrating a construction of a multi-color image forming apparatus including an intermediate transfer belt according to embodiments of the present invention. Referring to FIG. 1, arranged around a drum-shaped photoreceptor 1 as a first image bearing member that is rotated in a direction indicated by an arrow (A), are a photoreceptor cleaning unit 2, a charging device 4, an exposing device 5, an intermediate transfer belt 10, etc. A developing device of the multi-color image forming apparatus includes an yellow developing unit 6, a magenta developing unit 7, a cyan developing unit 8, and a black developing unit 9.

Next, an image forming operation of the multi-color image forming apparatus is described. By a known electrophotographic method, one or plural latent images of designated one to four colors are formed on the photoreceptor 1 by each color by the charging device 4 and the exposing device 5 both serving as a latent image forming device. Subsequently, each latent image is developed with a color toner corresponding to a latent image or with a designated color toner, i.e., one of yellow, magenta, cyan, and black toners which are deposited in the yellow developing unit 6, the magenta developing unit 7, the cyan developing unit 8, and the black developing unit 9, respectively. One or plural color toner images on the photoreceptor 1 are transferred to the intermediate transfer belt 10 rotating in synchronization with the rotations of the photoreceptor 1 by each color by applying a predetermined bias voltage to a primary transfer bias roller 11 serving as a primary transfer device (transfer from the photoreceptor 1 to the intermediate transfer belt 10 may be hereinafter referred to as a primary transfer). The transferred color toner images are sequentially superimposed on each other on the intermediate transfer belt 10. Subsequently, a complete toner image is collectively transferred to a transfer material 22 that is conveyed in synchronization with the rotations of the intermediate transfer belt 10 by applying a predetermined bias voltage to a secondary transfer bias roller 14 serving as a secondary transfer device (transfer from the intermediate transfer belt 10 to the transfer material 22 may be hereinafter referred to as a secondary transfer). The transferred toner image is fixed onto the transfer material 22 by a fixing device 17, and thereby a color print image is obtained (details of color image forming operations are described later).

After the primary transfer, the residual color toner on the photoreceptor 1 that has not transferred to the intermediate transfer belt 10 is removed by a blade 3 of the photoreceptor cleaning unit 2. After the secondary transfer, the residual color toner on the intermediate transfer belt 10 that has not transferred to the transfer material 22 is removed by a cleaning roller 20 of a belt cleaning unit 19.

The intermediate transfer belt 10 is spanned around a driving roller 13, a primary transfer bias roller 11, and driven rollers 12a, 12b, and is driven by a driving motor (not shown) to rotate in a direction indicated by an arrow (B). The primary transfer bias roller 11 is biased toward the rear surface of the intermediate transfer belt 10 by a pressing spring 27 such that the front surface of the intermediate transfer belt 10 is pressed against the surface of the photoreceptor 1.

In the embodiments of the present invention, the intermediate transfer belt 10 having a volume resistivity in a range of $10^8$ to $10^{12}$ $\Omega$cm and a surface resistivity in a range of $10^8$ to $10^{15}$ $\Omega$cm is employed. If the volume resistivity and the surface resistivity of the intermediate transfer belt 10 respectively exceed the above-defined ranges, a bias voltage necessary for the primary transfer and the secondary transfer rises up. As a result, the cost of electric power consumption increases. In addition, because a charging electric potential of the intermediate transfer belt 10 becomes high in a transfer step and in a transfer material separating step and self-discharge becomes hard to be performed, it may be necessary to provide a charge-removing device. On the contrary, if the volume resistivity and the surface resistivity of the intermediate transfer belt 10 respectively fall below the above-defined ranges, because a charging electric potential of the intermediate transfer belt 10 is attenuated quickly, self-discharge is easily performed. However, because electric current passes in a radial direction of the surface of the intermediate transfer belt 10 at the time of transfer, toner scattering may occur at the periphery of the image.

For measuring the volume resistivity and the surface resistivity of the intermediate transfer belt 10, the resistance meter (Hiresta IP, available from Mitsubishi Chemical Corporation) to which an HRS probe (Diameter of the inner-side electrode; 5.9 mm, Inside diameter of the ring electrode; 11 mm) had been connected was used. As the volume resistivity of the intermediate transfer belt 10, the current value measured by the above-described resistance meter ten seconds after applying the voltage of 100V across the front and rear surfaces of the intermediate transfer belt 10 was employed. As the surface resistivity of the intermediate transfer belt 10, the current value measured by the above-described resistance meter ten seconds after applying the voltage of 500V across the front and rear surfaces of the intermediate transfer belt 10 was employed.

The belt cleaning unit 19 includes a belt contact/separation mechanism 26 so as to enable the cleaning roller 20 to move into and out of contact with the intermediate transfer belt 10. The belt contact/separation mechanism 26 is configured to separate the cleaning roller 20 from the surface of the intermediate transfer belt 10 during a time period from the time the first color (yellow) toner image is transferred to the intermediate transfer belt 10 to the time the fourth color (black) toner image is transferred to the same. After the secondary transfer, the cleaning roller 20 is pressed against the surface of the intermediate transfer belt 10 at a predetermined timing by the belt contact/separation mechanism 26 and is driven to remove the residual toner on the intermediate transfer belt 10 that has not been transferred to the transfer material 22.

Figure 2:
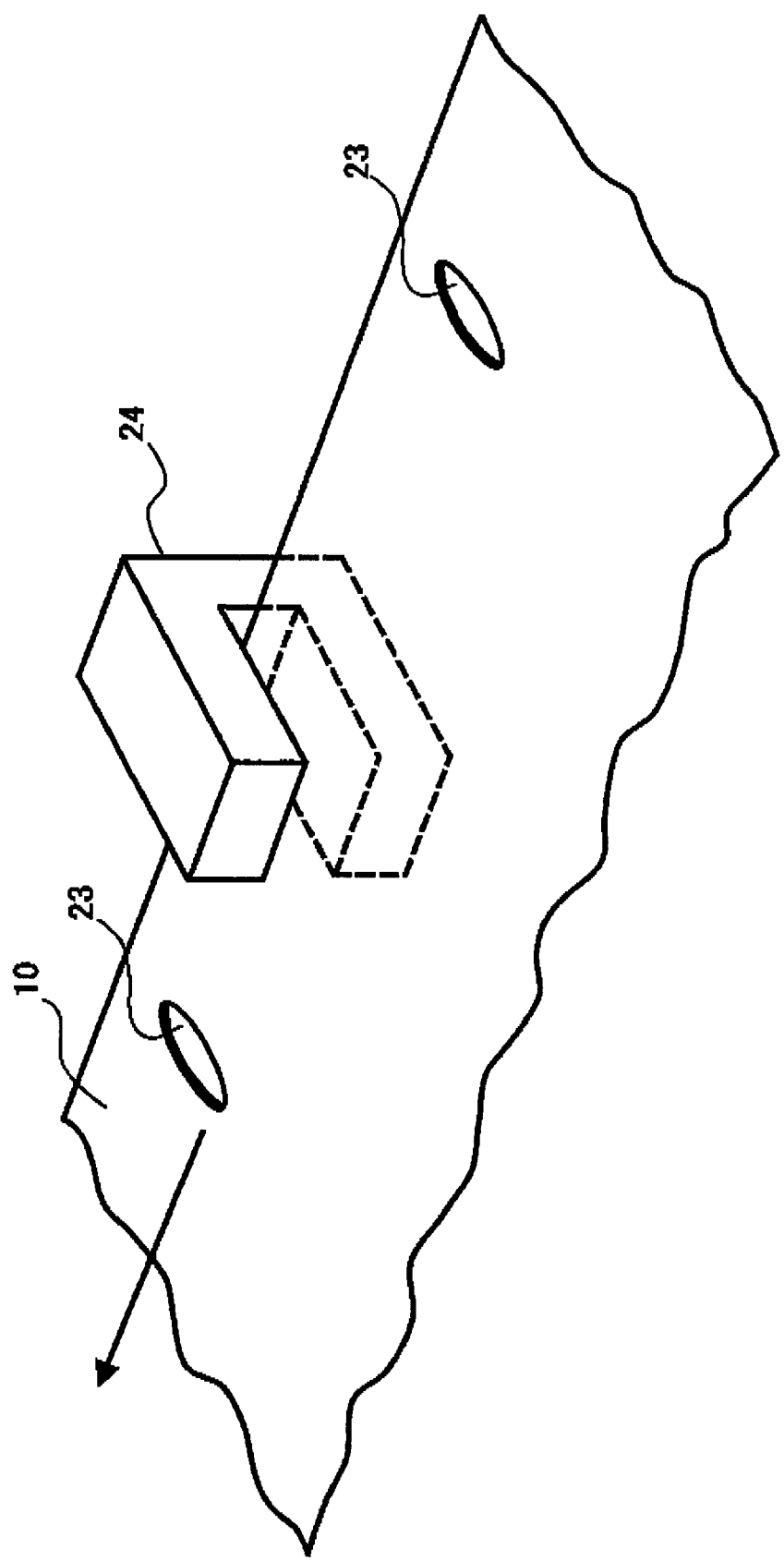
FIG. 2 is an enlarged view illustrating position detecting holes in the intermediate transfer belt and a mark sensor according to the embodiments of the present invention.

As illustrated in FIG. 2, a plurality of position detecting holes 23 as a position detecting mark are provided at somewhat inside from the one edge of the intermediate transfer belt 10 so as to detect the rotational position of the intermediate transfer belt 10 and to prevent deviation of the position of multi-color toner images which are transferred from the photoreceptor 1 to the intermediate transfer belt 10. By starting image forming operations for respective color toner images at the timing when a mark sensor 24 detects the position detecting hole 23, primary transfer starting timings of respective color toner images coincide with each other, and thereby respective color toner images can be accurately superimposed on each other.

In the embodiments of the present invention, as illustrated in FIG. 2, the position detecting hole 23 is formed in a shape of slit, and a photointeruptor including a light-emitting element and a light-receiving element is used as the mark sensor 24.

The secondary transfer bias roller 14 is provided with a secondary transfer unit 15. The secondary transfer unit 15 includes a transfer contact/separation mechanism 16 that enables the secondary transfer bias roller 14 to move into and out of contact with the intermediate transfer belt 10.

The secondary transfer bias roller 14 used in the embodiments of the present invention includes a metal shaft made of, for example, stainless steel (SUS), etc. An elastic member, for example, foam rubber and urethane rubber whose resistivity is controlled by conductive materials to be from $10^6$ to $10^{10}\Omega$, etc. is formed around the circumference of the metal shaft.

If the resistivity of the secondary transfer bias roller 14 exceeds $10^{10}\Omega$, electric current becomes hard to pass. Therefore, in order to obtain a required transfer performance of the secondary transfer bias roller 14, it is required to apply a high voltage to the secondary transfer bias roller 14. As a result, the cost of electric power consumption increases. Further, if such a high voltage is applied to the secondary transfer bias roller 14, discharge occurs at the space before and behind a nip portion between the intermediate transfer belt 10 and the secondary transfer bias roller 14 in the secondary transfer region. Consequently, several blank portions occur on the discharged portion of the image.

If the resistivity of the secondary transfer bias roller 14 is less than $10^6\Omega$, multi-color toner image portion (e.g., three-color toner image) and single-color toner image portion which exist on the same image can not be collectively transferred onto the transfer material. Specifically, in this case, although electric current sufficient for transferring the single-color toner image portion onto the transfer material at relatively low voltage can pass through the secondary transfer bias roller 14, voltage higher than an optimal voltage for transferring the single-color toner image portion onto the transfer material becomes necessary for transferring the multi-color toner image portion onto the transfer material. Accordingly, if the applying voltage to the secondary transfer bias roller 14 is set to an amount which allows the multi-color toner image portion to transfer onto the transfer material, transfer electric current applied to the single-color toner image portion becomes excessive. As a result, the efficiency in the secondary transfer may be decreased.

The resistivity of the secondary transfer bias roller 14 is calculated by the value of the electric current passing at the time of applying the voltage of 1000V across the metal shaft of the secondary transfer bias roller 14 and a conductive metal plate on which the secondary transfer bias roller 14 is mounted, on the condition that the load of total 9.8N is imposed on both end portions of the metal shaft (respectively, 4.9N at one side).

The secondary transfer bias roller 14 is driven via a driving gear (not shown). The circumferential velocity of the secondary transfer bias roller 14 is controlled to be substantially the same as that of the intermediate transfer belt 10 so as to avoid a slip between the secondary transfer bias roller 14 and the intermediate transfer belt 10.

The secondary transfer bias roller 14 is normally separate from the intermediate transfer belt 10 by the transfer contact/separation mechanism 16. However, when a complete toner image (four-color toner image in the case of a full-color toner image) on the surface of the intermediate transfer belt 10 is to be transferred to an image transfer position of the transfer material 22, the circumferential surface of the secondary transfer bias roller 14 is pressed against the rear surface of the transfer material 22 by the transfer contact/separation mechanism 16 with an appropriate timing. Subsequently, a predetermined bias voltage is applied to the secondary transfer bias roller 14 from a high voltage power supply 100, and thereby the toner image is collectively transferred onto the transfer material 22. The transfer material 22 is fed into a secondary transfer position at the time coincident with the arrival of the leading edge of the toner image on the intermediate transfer belt 10 to the secondary transfer position. The transfer material 22 with toner image transferred thereon is fixed to the transfer material 22 by the fixing device 17. Finally, the transfer material 22 is discharged to a sheet tray (not shown).

Next, full-color image forming operations performed in the multi-color image forming apparatus with the above-described configuration are described. Referring to FIG. 1, after the photoreceptor 1 is uniformly charged by the charging device 4, the exposing device 5 exposes the surface of the photoreceptor 1 with an image light corresponding to a yellow component image obtained by separating a full-color image into respective color component images. Thereby, the yellow component image is written on the photoreceptor 1 and a yellow latent image is formed thereon. Subsequently, the yellow latent image on the photoreceptor 1 is developed with a yellow toner deposited in the yellow developing unit 6, and thereby the yellow toner image is formed on the photoreceptor 1. Then, a predetermined bias voltage is applied to the primary transfer bias roller 11 contacting the rear surface of the intermediate transfer belt 10 from a high voltage power supply (not shown), and thereby the yellow toner image is transferred onto the intermediate transfer belt 10 from the photoreceptor 1. After the primary transfer of the yellow toner image, the photoreceptor 1 is cleaned by the blade 3 of the photoreceptor cleaning unit 2. Thus, a yellow toner image forming step is completed.

In parallel with the above-described primary transfer of the yellow toner image, the next magenta toner image forming step starts on the photoreceptor 1. After the photoreceptor 1 is uniformly charged by the charging device 4, the exposing device 5 exposes the surface of the photoreceptor 1 with an image light corresponding to a magenta component image obtained by separating a full-color image into respective color component images. Thereby, the magenta component image is written on the photoreceptor 1 and a magenta latent image is formed thereon. Subsequently, the magenta latent image on the photoreceptor 1 is developed with a magenta toner deposited in the magenta developing unit 7, and thereby the magenta toner image is formed on the photoreceptor 1. Then, a predetermined bias voltage is applied to the primary transfer bias roller 11 from a high voltage power supply (not shown), and thereby the magenta toner image formed on the photoreceptor 1 is transferred onto the surface of the intermediate transfer belt 10 in precise register with the yellow toner image. After the primary transfer of the magenta toner image, the photoreceptor 1 is cleaned by the blade 3 of the photoreceptor cleaning unit 2. Thus, a magenta toner image forming step is completed.

Following the yellow and magenta toner image forming steps, similar image forming operations including the formation of latent image, the development, and the primary transfer for cyan and black toner images are sequentially performed in the respective cyan and black toner image forming steps. By transferring the respective yellow, magenta, cyan, and black toner images sequentially formed on the photoreceptor 1 to the same image surface area on the intermediate transfer belt 10, a complete toner image is formed on the intermediate transfer belt 10 with four-color toner images superimposed on each other.

During a time period in which a four-color toner image is formed as described above, a top sheet of the sheets stacked in a sheet feeding cassette is fed by a sheet feeding roller 25 as the transfer material 22. The transfer material 22 is kept in a standby condition with the leading edge of the transfer material 22 is nipped between a pair of registration rollers 21 until the primary transfers of respective four color toner images are completed. After the primary transfers of respective four color toner images are completed, the registration rollers 21 rotate to feed the transfer material 22 at a timing such that a leading edge of the four-color toner image on the intermediate transfer belt 10 is coincident with an image transfer position (i.e., a secondary transfer position) of the transfer material 22. Further, the circumferential surface of the secondary transfer bias roller 14 is pressed against the rear surface of the transfer material 22 by the transfer contact/separation mechanism 16 with an appropriate timing. A predetermined bias voltage is applied to the secondary transfer bias roller 14 from the high voltage power supply 100, and thereby the four-color toner image on the intermediate transfer belt 10 is collectively transferred to the transfer material 22. The transferred four-color toner image is fixed onto the transfer material 22 by the fixing device 17. Finally, the transfer material 22 is discharged to a sheet tray (not shown). After the secondary transfer, the residual toner on the intermediate transfer belt 10 that has not transferred to the transfer material 22 is removed by the cleaning roller 20 of the belt cleaning unit 19.

As described above, the multi-color image forming apparatus according to the embodiments of the present invention has a full-color image forming mode wherein four color toner such as yellow, magenta, cyan, and black toners are used. Other than the full-color image forming mode, there are the following image forming modes; (1) a single-color image forming mode wherein one of yellow, magenta, cyan, and black toners is used; (2) a two-color image forming mode wherein two of yellow, magenta, cyan, and black toners are used; and (3) a three-color image forming mode wherein three of yellow, magenta, cyan, and black toners are used. By selecting one of the above-described four types of image forming modes on an operation unit (not shown), the multi-color image forming apparatus is configured to perform image forming operations according to the selected image forming mode.

Specifically, when the single-color image forming mode is selected in the multi-color image forming apparatus, an image corresponding to an original image (the original image may be multi-color image or single-color image) is written on the photoreceptor 1 by the exposing device 5 as a single-color image, and thereby a latent image is formed on the photoreceptor 1. Subsequently, the latent image is developed with one toner selected from yellow, magenta, cyan, and black toners, and the single-color toner image is formed on the photoreceptor 1. After the single-color toner image is transferred from the photoreceptor 1 onto the intermediate transfer belt 10 (i.e., the primary transfer), the single-color toner image on the intermediate transfer belt 10 is transferred onto the transfer material 22 (i.e., the secondary transfer). The single-color toner image is fixed on the transfer material 22 by the fixing device 17. Thus, the single-color image forming mode operation is completed.

When the two-color image forming mode is selected in the multi-color image forming apparatus, an image corresponding to an original image (the original image may be multi-color image or single-color image) is separated into two selected color component images. Then, a first color component image is written on the photoreceptor 1 by the exposing device 5, and thereby a first color latent image is formed thereon. Then, the first color latent image is developed with a first color toner, and thereby a first color toner image is formed on the photoreceptor 1. Subsequently, the first color toner image is transferred from the photoreceptor 1 onto the intermediate transfer belt 10 (i.e., the primary transfer). Next, a second color component image is written on the photoreceptor 1 by the exposing device 5, and a second color latent image is formed thereon. Then, the second color latent image is developed with a second color toner, and thereby a second color toner image is formed on the photoreceptor 1. Subsequently, the second color toner image is transferred from the photoreceptor 1 onto the intermediate transfer belt 10 in precise register with the first color toner image (i.e., the primary transfer). Then, the two-color toner image superimposed on each other on the intermediate transfer belt 10 is collectively transferred onto the transfer material 22 (i.e., the secondary transfer). The two-color toner image is fixed on the transfer material 22 by the fixing device 17. Thus, the two-color image forming mode operation is completed.

When the three-color image forming mode is selected in the multi-color image forming apparatus, an image corresponding to an original image (the original image may be multi-color image or single-color image) is separated into three selected color component images. Then, a first color component image is written on the photoreceptor 1 by the exposing device 5, and a first color latent image is formed thereon. The first color latent image is developed with a first color toner, and thereby a first color toner image is formed on the photoreceptor 1. Subsequently, the first color toner image is transferred from the photoreceptor 1 onto the intermediate transfer belt 10 (i.e., the primary transfer). Next, a second color component image is written on the photoreceptor 1 by the exposing device 5, and a second color latent image is formed thereon. The second color latent image is developed with a second color toner, and thereby a second color toner image is formed on the photoreceptor 1. Subsequently, the second color toner image is transferred from the photoreceptor 1 onto the intermediate transfer belt 10 in precise register with the first color toner image. (i.e., the primary transfer). Next, a third color component image is written on the photoreceptor 1 by the exposing device 5, and a third color latent image is formed thereon. The third color latent image is developed with a third color toner, and thereby a third color toner image is formed on the photoreceptor 1. Subsequently, the third color toner image is transferred from the photoreceptor 1 onto the intermediate transfer belt 10 in precise register with the first and second color toner images. (i.e., the primary transfer). Then, the three-color toner image superimposed on each other on the intermediate transfer belt 10 is collectively transferred onto the transfer material 22 (i.e., the secondary transfer). The three-color toner image is fixed on the transfer material 22 by the fixing device 17. Thus, the three-color image forming mode operation is completed.

When the above-described multi-color image forming operations in the two-color, three-color, and full-color image forming modes are repeatedly performed for the number of prints designated on the operation unit by an operator, the application of the transfer bias voltage to the secondary transfer bias roller 14 from the high voltage power supply 100 is turned off at a timing such that a trailing edge of the transfer material 22 has been completely passed through a nip portion of the secondary transfer bias roller 14. Subsequently, the secondary transfer bias roller 14 is separated from the intermediate transfer belt 10 by the transfer contact/separation mechanism 16 so as to prevent a toner image for a next print which is to be transferred onto the intermediate transfer belt 10 from adhering to the second transfer bias roller 14.

In the above-described multi-color image forming apparatus, a volume mean particle diameter of the toner is preferably in a range of 4 $\mu$m to 10 $\mu$m. If the volume mean particle diameter of the toner is less than 4 $\mu$m, a background fouling may occur at the time of development, and a blank image (i.e., some portions of the image are dropped) is likely to occur because fluidity of toner is typically degraded and thereby the toner is likely to be aggregated in the developing unit. On the contrary, if the volume mean particle diameter of the toner exceeds 10 $\mu$m, a toner scattering may occur at the periphery of the image, and a precise image may not be obtained due to low resolution of image. Therefore, a toner having the volume mean particle diameter of 7.5 $\mu$m is employed in the multi-color image forming apparatus according to the embodiments of the present invention.

In the above-described multi-color image forming apparatus, as an alternative to the drum-shaped photoreceptor 1, any image bearing members such as a belt-shaped photoreceptor, etc. can be employed. Further, although a transfer method wherein the primary transfer bias roller 11 and the secondary transfer bias roller 14 are used as the primary transfer device and the secondary transfer device, respectively, is employed in the embodiments of the present invention, other transfer methods such as for example, a rotary/contact-type transfer method using a rotary-type transfer brush, etc. and a transfer method using a transfer brush, a transfer blade, a transfer plate, etc. can be employed.

Next, a method of producing the intermediate transfer belt 10 for the multi-color image forming apparatus according to the embodiments of the present invention is described. FIG.

3 is a schematic view of a cylindrical mold 30 of a centrifugal molding apparatus (not shown) used for producing the intermediate transfer belt 10. The cylindrical mold 30 having an inside diameter of 175 mm is employed in the embodiments of the present invention. The mold 30 does not necessarily have a cylinder shape, but the cylindrical mold 30 can easily form a uniform layer thickness of the intermediate transfer belt 10.

On the inner peripheral surface of the cylindrical mold 30, protruding members 31 are provided at positions corresponding to the positions of the above-described position detecting holes 23 in the intermediate transfer belt 10 (illustrated in FIG. 2) as the position detecting marks for detecting the rotational position of the intermediate transfer belt 10, i.e., at the positions somewhat inside from the one edge of the intermediate transfer belt 10.

Hereinafter described is the intermediate transfer belt 10 according to a first embodiment of the present invention.

Figure 3:
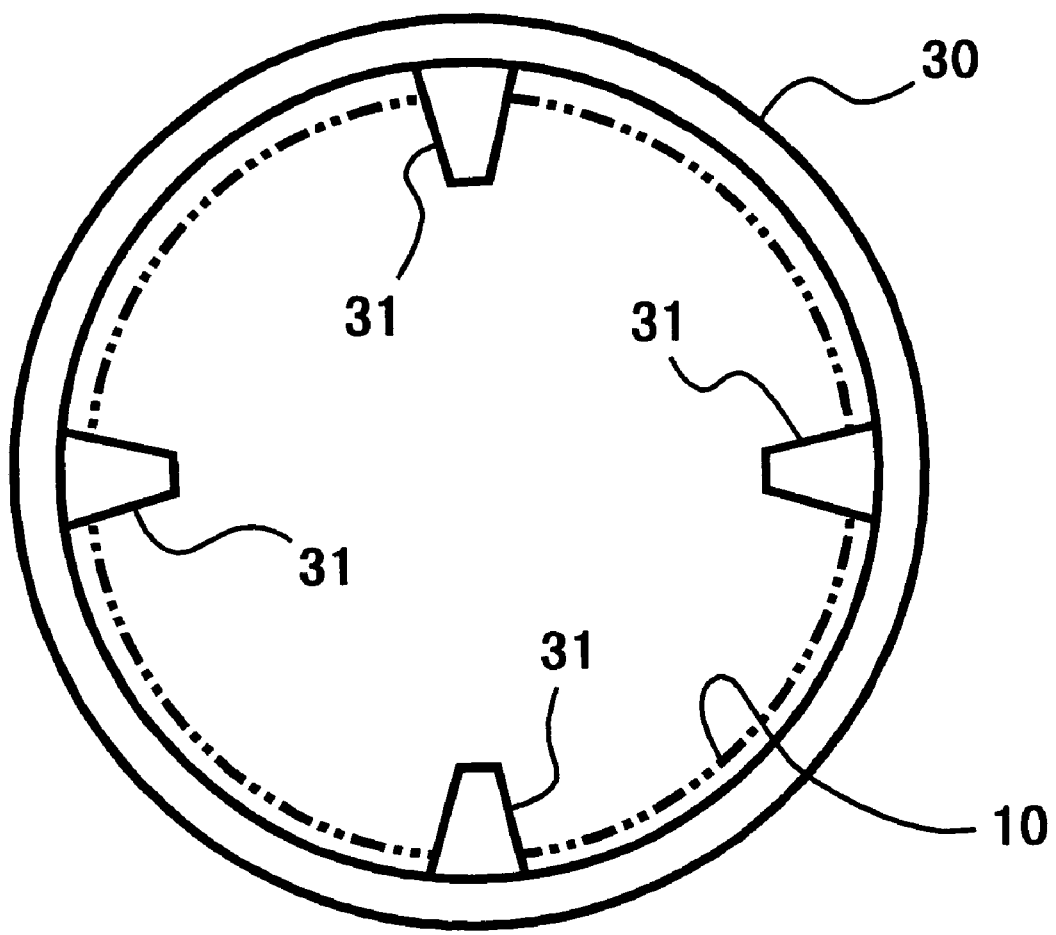
FIG. 3 is a schematic view illustrating a cylindrical mold for producing the intermediate transfer belt, and protruding members provided on an inner peripheral surface of the cylindrical mold according to the embodiments of the present invention.

Referring to FIG. 3, the intermediate transfer belt 10 is produced in a shape of an endless belt indicated by a two-dots-and-dash line in FIG. 3 by a centrifugal molding method by injecting a liquid material of the intermediate transfer belt 10 to the inner peripheral surface of the cylindrical mold 30 while being rotated.

While the liquid material is being formed into the endless belt by the centrifugal molding method, at least one position detecting hole 23 for detecting the rotational position of the intermediate transfer belt 10 is formed in the endless belt by the at least one protruding member 31 provided on the inner peripheral surface of the cylindrical mold 30 (e.g., four position detecting holes 23 are formed by four protruding members 31 in the case of the cylindrical mold 30 illustrated in FIG. 3).

In the above-described method of producing the intermediate transfer belt 10, because the position detecting hole 23 of the intermediate transfer belt 10 is formed while the liquid material is being formed into the endless belt by the centrifugal molding method, the position detecting hole 23 is always formed at a constant position. As a result, because nonuniformity in the position of the position detecting hole 23 does not occur, the position of the intermediate transfer belt 10 can be detected with high accuracy.

Further, it can avoid producing the above-described residue as a waste when the position detecting hole 23 is formed in the intermediate transfer belt 10. Accordingly, the above-described method of producing the intermediate transfer belt 10 particularly has an advantage when a plurality of position detecting holes 23 are formed in the intermediate transfer belt 10.

Figure 4:
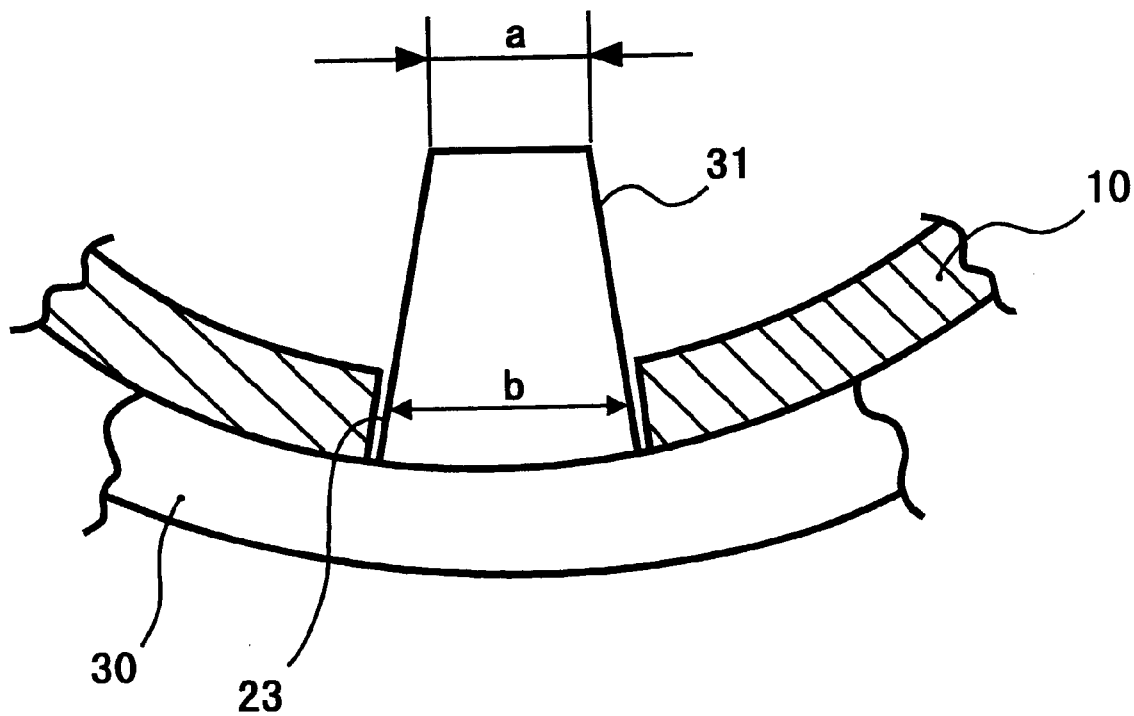
FIG. 4 is an enlarged view illustrating the protruding member shown in FIG. 3.

FIG. 4 is an enlarged view of one example of the protruding member 31. The protruding member 31 is tapered toward the rotational center of the cylindrical mold 30, i.e., a width "b" of a bottom portion of the protruding member 31 is greater than a width "a" of a tip portion thereof. By tapering the protruding member 31, it becomes easy to separate the intermediate transfer belt 10 from the protruding member 31 when the intermediate transfer belt 10 is taken out from the cylindrical mold 30 after being produced by the centrifugal molding method. Therefore, the intermediate transfer belt 10 can be smoothly taken out from the cylindrical mold 30, and it can prevent damage to the position detecting hole 23 when the intermediate transfer belt 10 is separated from the protruding member 31 and taken out from the cylindrical mold 30.

When the intermediate transfer belt 10 is produced in the cylindrical mold 30, it is preferable to apply a mold release agent to the protruding member 31. Thereby, the intermediate transfer belt 10 can be more easily separated from the protruding member 31. Examples of the mold release agent employable herein include fluororesin such as ETFE (ethylene-tetrafluoroethylene copolymers), PTFE (polytetrafluoroethylene), PVDF (polyvinylidene fluoride), PEA (perfluoroalkoxy fluororesin), FEP (tetrafluoroethylene-hexafluoropropylene copolymers), PVF (polyvinylfluoride), etc. However, the mold release agent is not limited to the above-described fluororesin.

Figure 5:
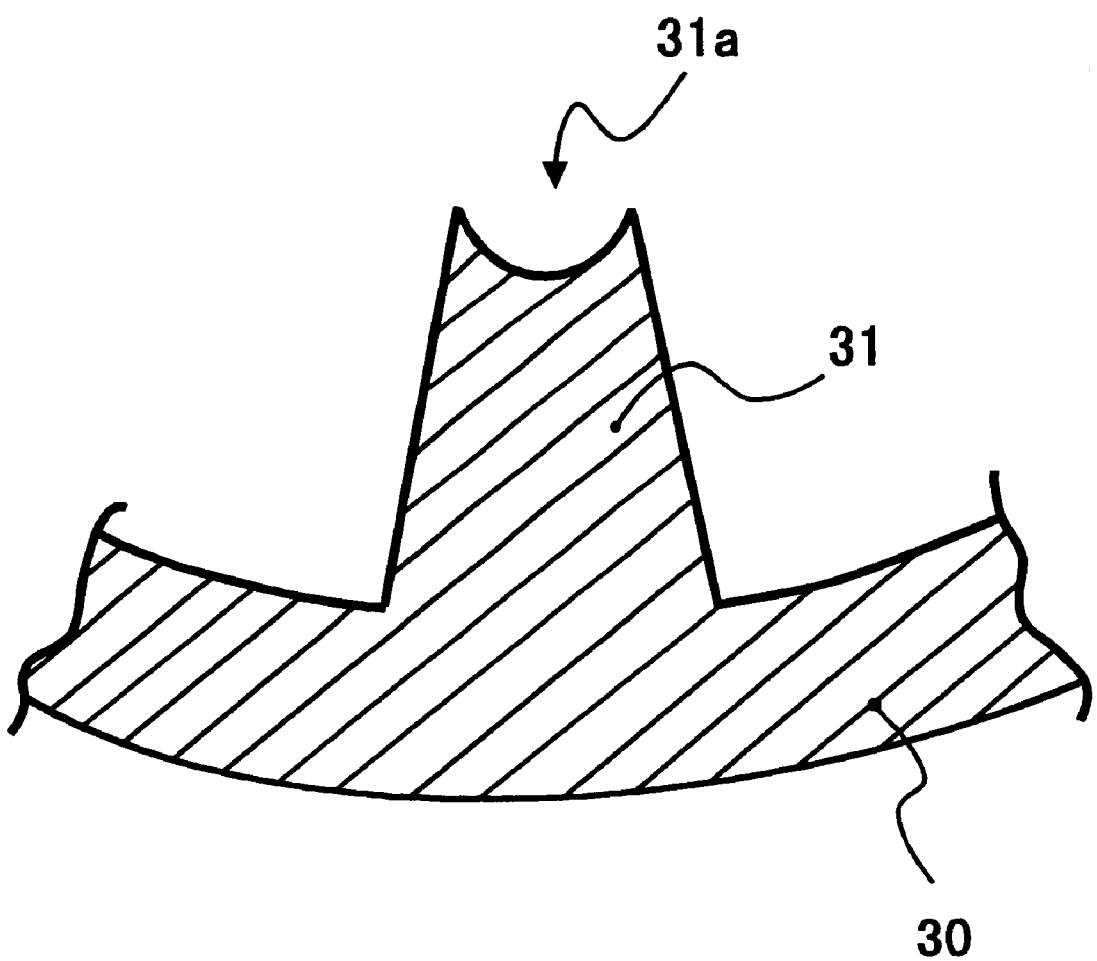
FIG. 5 is a sectional view illustrating a protruding member according to an embodiment of the present invention wherein a concave portion is formed at a tip portion of the protruding member.
Figure 6:
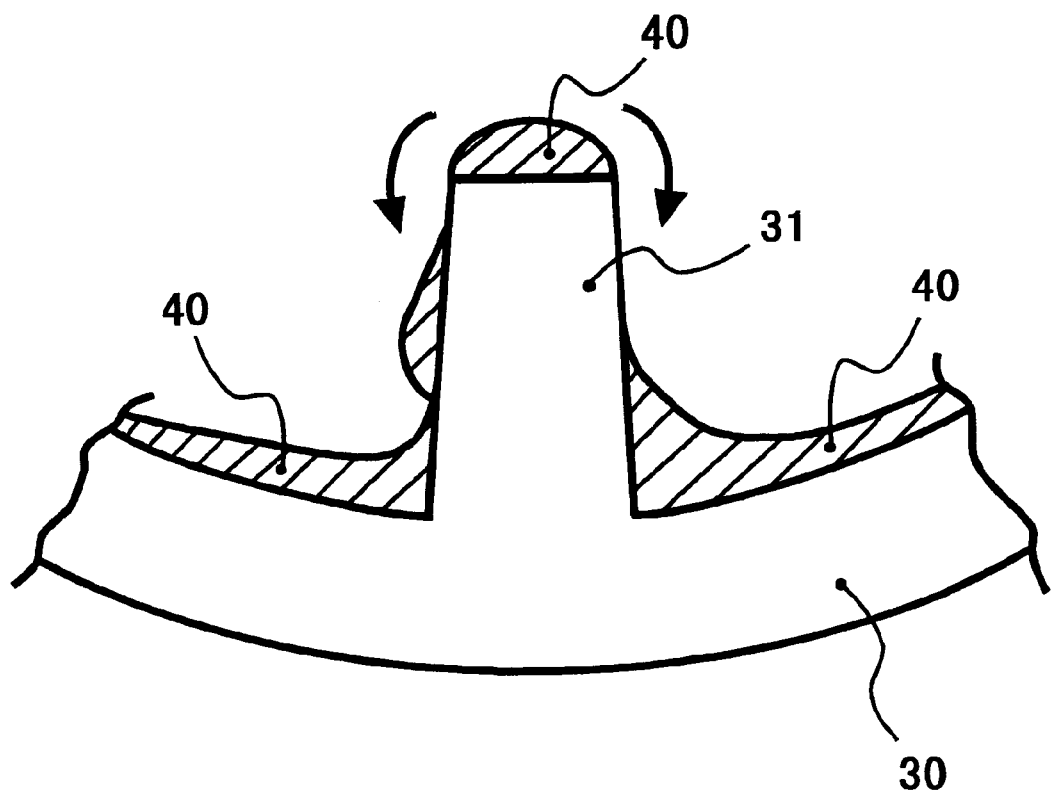
FIG. 6 is a schematic view showing a liquid material being deposited around a bottom part of the protruding member.

As illustrated in FIG. 5, it is preferable to form a concave portion 31a at the tip portion of the protruding member 31. FIG. 6 illustrates the cylindrical mold 30 wherein a liquid material 40 is deposited around the bottom portion of the protruding member 31 after being carried along the protruding member 31 from the tip portion toward the bottom portion of the protruding member 31 by the centrifugal force at the time of centrifugal forming. Owing to the concave portion 31a, the liquid material 40 adhered to the tip portion of the protruding member 31 can be deposited in the concave portion 31a, and can be prevented from depositing around the bottom portion of the protruding member 31. By avoiding the deposition of the liquid material 40 around the bottom portion of the protruding member 31, it can prevent uneven thickness of the intermediate transfer belt 10 and cracks of the position detecting hole 23 occurred when the intermediate transfer belt 10 is taken out from the cylindrical mold 30. As a result, the intermediate transfer belt 10 that can rotate stably and has a long useful life can be obtained.

Moreover, it is preferable that the concave portion 31a of the protruding member 31 dents deeply. Thereby, the liquid material 40 adhered to the tip portion of the protruding member 31 can be deposited further in the concave portion 31a. As a result, it can surely prevent the liquid material 40 from being deposited around the bottom portion of the protruding member 31.

Figure 7:
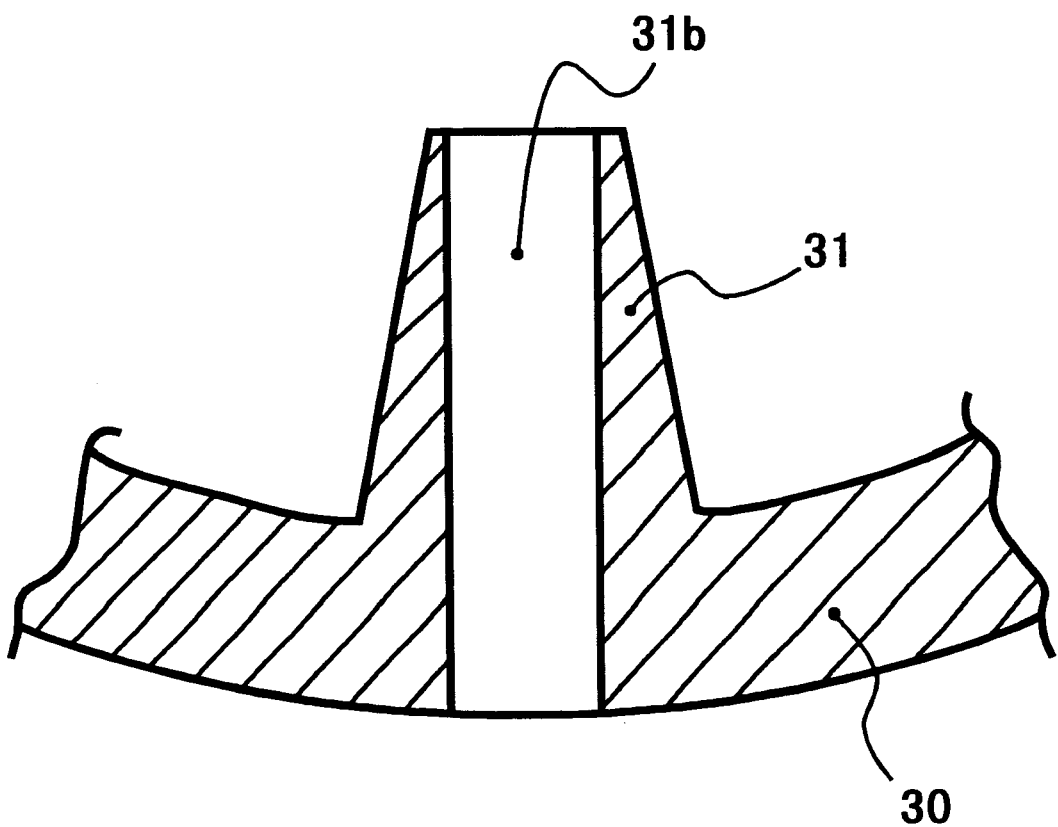
FIG. 7 is a sectional view illustrating a protruding member according to an embodiment of the present invention wherein a through hole is formed through the protruding member.

Alternatively, as illustrated in FIG. 7, a through hole 31b may be formed through the protruding member 31. In this case, the through hole 31b allows the liquid material 40 adhered to the tip portion of the protruding member 31 to be discharged from the cylindrical mold 30 through the through hole 31b. As a result, the deposit of the liquid material 40 around the bottom portion of the protruding member 31 can be avoided more effectively.

Figure 8:
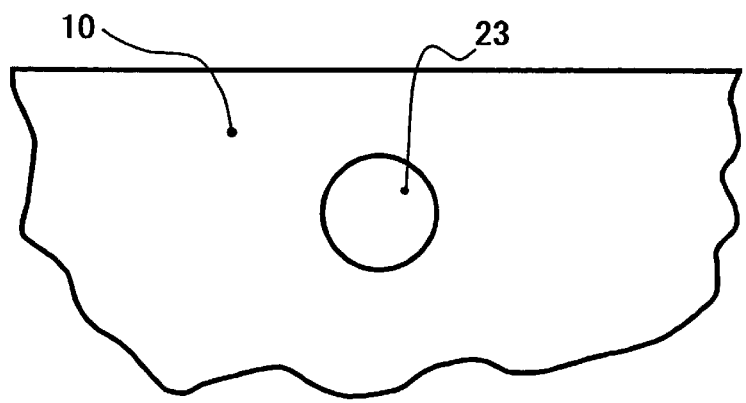
FIG. 8 is an enlarged view illustrating a position detecting hole in a shape of circle according to an embodiment of the present invention.
Figure 9:
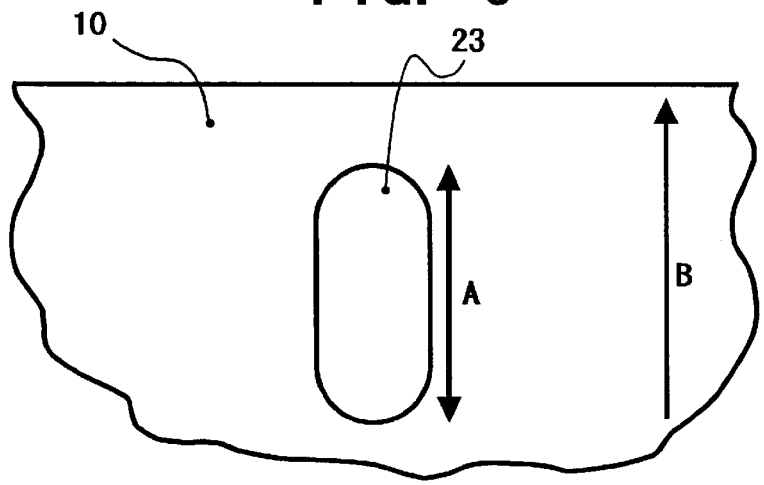
FIG. 9 is an enlarged view illustrating a position detecting hole in a shape of ellipse according to an embodiment of the present invention.
Figure 10:
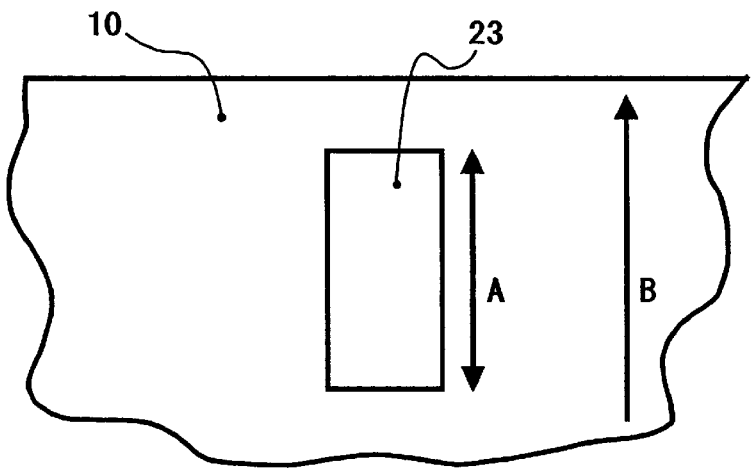
FIG. 10 is an enlarged view illustrating a position detecting hole in a shape of rectangle according to an embodiment of the present invention.

The position detecting hole 23 formed by the protruding member 31 may have a circular, an elliptic, or a rectangular shape as illustrated in FIGS. 8, 9, and 10, respectively, or an elongated circle shape or a square shape. Because these shapes are simple, the protruding member 31 can be molded easily with a low cost.

When the position detecting hole 23 has four corners, cracks may occur due to stress concentration at the four corners. As a result, durability of the intermediate transfer belt 10 may be degraded. Therefore, it is preferable that the position detecting hole 23 is formed into a circular or an elliptic shape in which the stress concentration is not likely to occur. Thereby, the intermediate transfer belt 10 with high durability wherein the damage to the position detecting hole 23 hardly occurs can be obtained.

When the position detecting hole 23 has an elliptic or a rectangular shape, as illustrated in FIGS. 9 and 10, it is preferable to form the position detecting hole 23 such that a longitudinal direction "A" of the position detecting hole 23 is in the same direction as a width direction "B" of the intermediate transfer belt 10.

In the above-described endless intermediate transfer belt 10, zigzag movements of the intermediate transfer belt 10 in the width direction thereof occur to some extent while being rotated, even though zigzag movement control measures are taken. Therefore, the position of the position detecting hole 23 is deflected in the width direction of the intermediate transfer belt 10, i.e., the deflecting direction of the intermediate transfer belt 10 due to the zigzag movements of the intermediate transfer belt 10 while being rotated. As a result, the position detecting hole 23 deviates from a position detecting light path of the mark sensor 24 (illustrated in FIG. 2) which detects the position detecting hole 23, and thereby an error in detecting the position detecting hole 23 by the mark sensor 24 may occur.

Thus, by forming the position detecting hole 23 such that a longitudinal direction of the position detecting hole 23 is in the same direction as a width direction of the intermediate transfer belt 10, the position detecting hole 23 does not easily deviate from the position detecting light path of the mark sensor 24 even when the intermediate transfer belt 10 makes zigzag movements and the position of the position detecting hole 23 is deflected in the width direction of the intermediate transfer belt 10. As a result, an error in detecting the position detecting hole 23 by the mark sensor 24 can be avoided.

The material for the intermediate transfer belt 10 should have a property which makes the intermediate transfer belt 10 hard to extend and rotate smoothly. A preferable tensional modulus of elasticity of the intermediate transfer belt 10 is in a range of $2 \times 10^2$ MPa to $3 \times 10^5$ MPa, more preferably in a range of $6 \times 10^2$ MPa to $3 \times 10^5$ MPa, or still more preferably in a range of $8.5 \times 10^2$ MPa to $3 \times 10^5$ MPa.

If the tensional modulus of elasticity of the intermediate transfer belt 10 falls below the above-defined range, the intermediate transfer belt 10 expands and contracts under load during driving. As a result, in a multi-color image forming process, the deviation of the position of multi-color toner images is caused at a primary transfer portion on the intermediate transfer belt 10. Also in a single-color image forming process, due to the above-described expansion and contraction of the intermediate transfer belt 10, an error occurs in the length of toner image in the rotational direction of the intermediate transfer belt 10. As a result, a transfer image is deformed.

On the contrary, if the tensional modulus of elasticity of the intermediate transfer belt 10 exceeds the above-defined range, the intermediate transfer belt 10 hardly extends. As a result, the intermediate transfer belt 10 does not make contact closely with the driving roller 13, and thereby the deviation of the position of multi-color toner images is likely to occur due to a slip of the intermediate transfer belt 10. In order to avoid the slip of the intermediate transfer belt 10, it is preferable to apply a high tension to the intermediate transfer belt 10. However, this results in the necessity of increasing the strength of the driving roller 13, the driven rollers 12a, 12b around which the intermediate transfer belt 10 is spanned, and the reinforcement of frames supporting the rollers 12a, 12b, 13. In this case, the size of the apparatus increases.

As a material for the intermediate transfer belt 10 that satisfies the above-defined range of the tensional modulus of elasticity of the intermediate transfer belt 10, a resin material is employed. Examples of the resin material include PVDF, ETFE, PI (polyimide), PC (polycarbonate), etc. wherein an electrically conductive material such as carbon black, etc. is dispersed, respectively.

Hereinafter described is a method of producing the endless intermediate transfer belt 10 according to the first embodiment of the present invention. First, the liquid material 40 wherein carbon black is dispersed in PVDF is supplied onto the inner peripheral surface of the cylindrical mold 30 rotating at a high speed. Then, an endless belt is heated and dried so as to be hardened. Subsequently, the endless belt is taken out from the cylindrical mold 30, and is cut into the predetermined size. The material of the intermediate transfer belt 10 is not limited to the above-described resin materials. Alternatively, other materials, such as, for example, rubber, fluorine-containing rubber, etc. can be employed.

As illustrated in FIG. 3, four protruding members 31 are provided on the inner peripheral surface of the cylindrical mold 30 which are equally spaced apart from each other a predetermined distance. By these four protruding members 31, four position detecting holes 23 are formed in the intermediate transfer belt 10 while the liquid material 40 is being formed into the endless belt. Because a plurality of position detecting holes 23 are formed in the intermediate transfer belt 10, an image forming operation can be performed with reference to one of the position detecting holes 23 which the mark sensor 24 detects first. Therefore, a time taken for an image forming process, i.e., a time taken until printing completion, can be reduced.

Further, by forming plural of the position detecting holes 23 in the intermediate transfer belt 10 while the liquid material 40 is being formed into the endless belt, the intermediate transfer belt 10 without nonuniformity in the position of the position detecting hole 23 can be obtained. Accordingly, a pitch between respective position detecting holes 23 can be obtained precisely.

In the above-described case that the intermediate transfer belt 10 is produced by a centrifugal molding method, an endless belt with a uniform film can be produced by supplying the liquid material 40 onto the inner peripheral surface of the rotating cylindrical mold 30 through a spray or a nozzle, rotating the cylindrical mold 30 at a high speed, and spreading the liquid material 40 uniformly onto the inner peripheral surface of the cylindrical mold 30 under centrifugal force.

Further, in this centrifugal molding method, because an electrically conductive material can be uniformly dispersed and oriented in the liquid material 40, and deviation of pressing force applied onto the liquid material 40 does not occur when the endless belt is produced in the cylindrical mold 30, the intermediate transfer belt 10 wherein nonuniformity in the resistivity of the intermediate transfer belt 10 hardly occurs can be obtained. In the extrusion method, the above-described nonuniformity in resistivity of an intermediate transfer belt typically occurs.

When image forming operations were performed in the multi-color image forming apparatus including the intermediate transfer belt 10 according to the first embodiment of the present invention, high quality full color images without the transfer unevenness and the deviation of the position of multi-color toner images were obtained.

Figure 11:
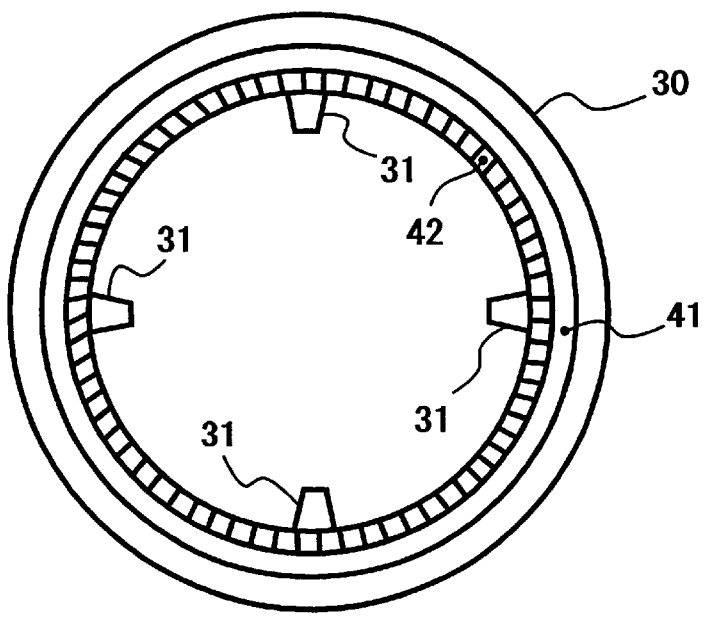
FIG. 11 is a view showing an intermediate transfer belt in production according to a second embodiment of the present invention.

Hereinafter described is the intermediate transfer belt 10 according to a second embodiment of the present invention. In the first embodiment of the present invention, the intermediate transfer belt 10 has a single layer made of the liquid material 40 of fluororesin. In the second embodiment of the present invention, the intermediate transfer belt 10 is formed in a two layer structure including a surface layer 41 and a base layer 42 as illustrated in FIG. 11. The outer surface of the surface layer 41 serves as a toner image bearing surface to which the toner image is transferred from the photoreceptor 1. As a material for the surface layer 41 of the intermediate transfer belt 10, it should have a flexible (elastic) property which allows the surface layer 41 to contact the surface of the photoreceptor 1 tightly so as to avoid occurrence of a transfer blank image (i.e., only a part of a toner image is transferred to the intermediate transfer belt 10 but some portions of the toner image are not transferred from the photoreceptor 1).

Preferable hardness which is prescribed in JIS-A (Japanese Industrial Standards) of the surface layer 41 is in a range of 10 degrees to 90 degrees, more preferably, in a range of 20 degrees to 80 degrees, or still more preferably, in a range of 30 degrees to 70 degrees. If the hardness of the surface layer 41 is deviated from the above-defined range, the surface of the intermediate transfer belt 10 at a nip portion may be deformed and a pressure at the nip portion may be increased at the time of the primary transfer and the secondary transfer. As a result, the transferred toner image may be pressed and deformed.

As a material for the surface layer 41 of the intermediate transfer belt 10 that satisfies the above-described conditions, elastomer and rubber can be used. Examples of the elastomer and rubber are as follows, though not being limited to these. Specific examples thereof include fluororubber, nitrile rubber, urethane rubber, isoprene rubber, ethylene-propylene copolymers, nitrile-butadiene rubber, chloroprene rubber, styrene-butadiene rubber, high styrene rubber, butadiene rubber, butyl rubber, silicone rubber, acrylic rubber, epichlorohydrin rubber, norbornene rubber, etc. By mixing 100 parts by weight of the above-described elastomer and rubber materials with 10 parts by weight or more of a lubricant having lubricating property and high water repellency, toner can be smoothly separated from the intermediate transfer belt 10, so that toner images can be efficiently transferred to the transfer material from the intermediate transfer belt 10, and the transfer blank image can be prevented.

Preferable examples of a material for the lubricant include fluorine compounds such as fluoroelastomer, fluororubber, PTFE, PVDF, ETFE and tetrafluoroethylene-perfluoroalkyl vinyl ether copolymers (PFA), silicone compounds such as silicone particulate resin, silicone rubber, silicone elastomer, etc., polyethylene (PE), polypropylene (PP), polystyrene (PS), epoxy resin, etc. More preferably, fluorine-containing particulate resin may be employed.

When the surface layer 41 of 500 $\mu$m in thickness was formed by mixing 19 parts by weight of polytetrafluoroethylene (PTFE) particulate resin with 100 parts by weight of urethane rubber whose hardness (JIS-A) was controlled to 45 degrees, the tensile breaking elongation of the intermediate transfer belt 10 was 220%.

When the surface layer 41 is produced by the centrifugal molding method, the polytetrafluoroethylene (PTFE) particulate resin dispersed in the surface layer 41 is concentrated at the inner peripheral surface side of the cylindrical mold 30 by centrifugal force caused by the weight of the resin itself. Thereby, the PTFE particulate resin is present in the front surface side of the intermediate transfer belt 10 in an amount greater than in the rear surface side thereof while being oriented. As a result, toner can be separated from the intermediate transfer belt 10 properly.

On the other hand, the inner surface of the base layer 42 makes contact with the driving roller 13 and the driven rollers 12a, 12b around which the intermediate transfer belt 10 is spanned. As a material for the base layer 42 of the intermediate transfer belt 10, it should have a property which makes the intermediate transfer belt 10 to rotate smoothly and hard to extend so as to avoid the deviation of the position of multi-color toner images caused by a slip and expansion/contraction of the intermediate transfer belt 10 at the time of rotations of the intermediate transfer belt 10. As described above, it is preferable that the surface layer 41 and the base layer 42 are made of respective materials having opposite properties each other.

Preferable tensional modulus of elasticity of the base layer 42 is in a range of $2\times10^2$ MPa to $3\times10^5$ MPa, more preferably, in a range of $6\times10^2$ MPa to $3\times10^5$ MPa, or still more preferably, in a range of $8.5\times10^2$ MPa to $3\times10^5$ MPa.

If the tensional modulus of elasticity of the base layer 42 falls below the above-defined range, the intermediate transfer belt 10 expands and contracts under load during driving. As a result, in a multi-color image forming process, the deviation of the position of multi-color toner images is caused at a primary transfer portion on the intermediate transfer belt 10. Also in a single-color image forming process, due to the above-described expansion and contraction of the intermediate transfer belt 10, an error occurs in the length of toner image in the rotational direction of the intermediate transfer belt 10. As a result, a transfer image is deformed.

On the contrary, if the tensional modulus of elasticity of the base layer 42 exceeds the above-defined range, the intermediate transfer belt 10 can hardly extend. As a result, the intermediate transfer belt 10 does not make contact closely with the driving roller 13, and thereby the deviation of the position of multi-color toner images is likely to occur due to a slip of the intermediate transfer belt 10. In order to avoid the slip of the intermediate transfer belt 10, it is preferable to apply a high tension to the intermediate transfer belt 10. However, this results in the necessity of increasing the strength of the driving roller 13, the driven rollers 12a, 12b around which the intermediate transfer belt 10 is spanned, and the reinforcement of frames supporting the rollers 12a, 12b, 13. In this case, the size of the apparatus increases.

In the intermediate transfer belt 10 according to the second embodiment of the present invention, because the tensional modulus of elasticity of the base layer 42 is set in a range of $2\times10^2$ MPa to $3\times10^5$ MPa, it can prevent the slip and expansion/contraction of the intermediate transfer belt 10 without applying a tension larger than that required for the intermediate transfer belt 10. As a result, the deviation of the position of multi-color toner images and deformation of the toner images can be prevented.

Figure 12:
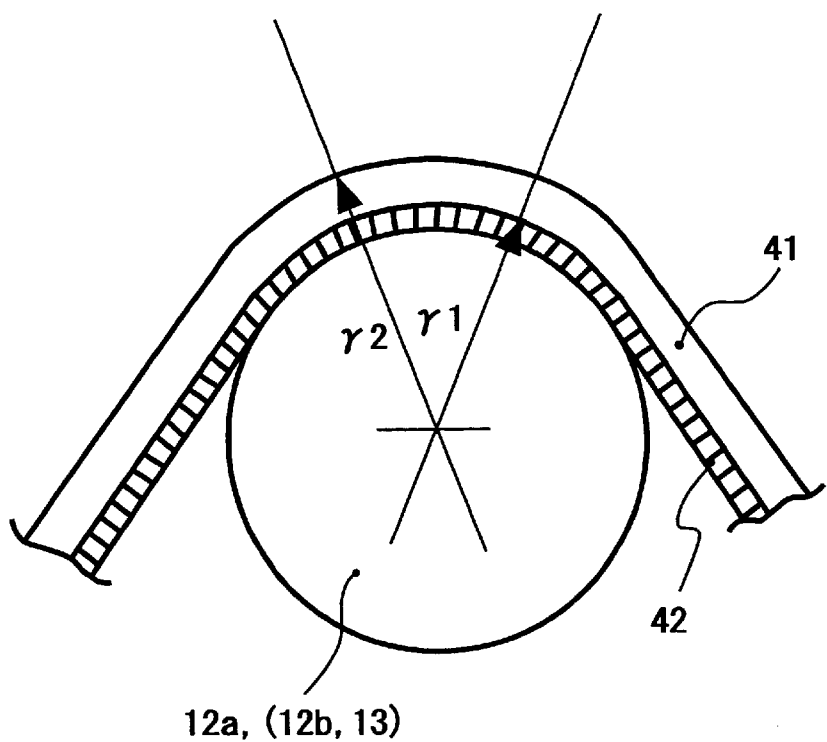
FIG. 12 is a schematic view illustrating a curved portion of the intermediate transfer belt shown in FIG. 11 being spanned around rollers.

Further, in the intermediate transfer belt 10 according to the second embodiment of the present invention, the tensile breaking elongation of the surface layer 41 is set to be greater than that of the base layer 42. As illustrated in FIG. 12, because the intermediate transfer belt 10 is curved while being spanned around the driving roller 13, the driven rollers 12a, 12b, a curvature radius (r2) of the outer surface of the curved portion of the surface layer 41 becomes greater than a curvature radius (r1) of the outer surface of the curved portion of the base layer 42. Thus, the surface layer 41 is expanded at the curved portion of the intermediate transfer belt 10. Because the surface layer 41 repeatedly expands in the image forming operations, if the tensile breaking elongation of the surface layer 41 is not greater than that of the base layer 42, wrinkles and cracks may occur on the surface of the surface layer 41 over time. This may result in image deterioration.

In addition, the tensile breaking elongation of the base layer 42 is preferably 102% or greater. In this condition, the base layer 42 can be spanned around the driving roller 13, the driven rollers 12a, 12b such that the base layer 42 expands to a small extent, and the base layer 42 and the driving roller 13 can contact closely. As a result, the deviation of the position of multi-color toner images due to a slip of the intermediate transfer belt 10 while being driven can be avoided.

If the tensile breaking elongation of the base layer 42 is less than 102%, it becomes difficult to bring the base layer 42 in tight contact with the driving roller 13. Further in this condition, because it is necessary to apply a large amount of tension to the intermediate transfer belt 10 so as to avoid a slip of the intermediate transfer belt 10 while being driven, the intermediate transfer belt 10 may be torn by such a large amount of tension.

Examples of the resin materials for the base layer 42 which satisfy the above-described conditions include phenol resin, epoxy resin, polyester resin, low molecular weight polyethylene, low molecular weight polypropylene, ionomer resin, polyurthane resin, silicone resin, fluororesin, polycarbonate, polyamide resin, polyvinyl butyral resin, and styrene resin (homopolymers or copolymers containing styrene or substituted styrene) such as polystyrene, chloropolystyrene, poly-α-methyl styrene, styrene-butadiene copolymers, styrene-vinyl chloride copolymers, styrene-vinyl acetate copolymers, styrene-maleic acid copolymers, styrene-acryl ester copolymers (styrene-methyl acrylate copolymers, styrene-ethyl acrylate copolymers, styrene-butyl acrylate copolymers, styrene-octyl acrylate copolymers, styrene-phenyl acrylate copolymers, etc.), styrene-methacrylate ester copolymers (styrene-methyl methacrylate copolymers, styrene-ethyl methacrylate copolymers, styrene-phenyl methacrylate copolymers, etc.), styrene-α-methyl chloroacrylate copolymers, styrene-acrylonitrile-acryl ester copolymers, etc., and vinyl chloride resin, rosin modified maleic resin, ketone resin, ethylene-ethyl acrylate copolymers, and xylene resin. Copolymers of these resins can be also used, and these resins can be used alone or in combinations.

When the base layer 42 of 150 μm in thickness was made of polyvinylidene fluoride (PVDF), the tensional modulus of elasticity of the base layer 42 was $10.5 \times 10^2$ MPa, and the tensile breaking elongation of the base layer 42 was 135%.

Hereinafter described is a method of producing the intermediate transfer belt 10 according to the second embodiment of the present invention. First, the surface layer 41 in a shape of endless belt is formed by supplying the above-described material for the surface layer 41 onto the inner peripheral surface of the cylindrical mold 30 rotating at a high speed. Then, an endless belt (i.e., the surface layer 41) is heated and dried so as to be hardened. Subsequently, the above-described material for the base layer 42 is supplied onto the inner peripheral surface of the endless surface layer 41 which has been formed on the inner peripheral surface of the cylindrical mold 30 rotating at a high speed. Then, an endless belt (i.e., the base layer 42) is heated and dried so as to be hardened. Subsequently, the endless belt formed in a two layer structure including the surface layer 41 and the base layer 42 is taken out from the cylindrical mold 30, and is cut into the predetermined size.

In the intermediate transfer belt 10 according to the second embodiment of the present invention, four position detecting holes 23 are formed in the same manner as in the first embodiment of the present invention. Specifically, as illustrated in FIG. 3, four protruding members 31 are provided on the inner peripheral surface of the cylindrical mold 30 which are equally spaced apart from each other a predetermined distance. By these four protruding members 31, four position detecting holes 23 are formed in the intermediate transfer belt 10 while the liquid materials are being formed into the endless belt. Because a plurality of position detecting holes 23 are formed in the intermediate transfer belt 10, an image forming operation can be performed with reference to one of the position detecting holes 23 which the mark sensor 24 detects first. Therefore, a time taken for an image forming process, i.e., a time taken until printing completion, can be reduced.

Further, by forming the position detecting hole 23 in the intermediate transfer belt 10 while the liquid materials are being formed into the endless belt, the intermediate transfer belt 10 without nonuniformity in the position of the position detecting hole 23 can be obtained.

When image forming operations were performed in the multi-color image forming apparatus including the intermediate transfer belt 10 according to the second embodiment of the present invention, high quality full color images without the transfer unevenness, the deviation of the position of multi-color toner images and the transfer blank image were obtained.

In the intermediate transfer belt 10 having a multi-layer structure according to the second embodiment of the present invention, it is preferable to supply a plurality of liquid materials respectively onto the inner peripheral surface of the cylindrical mold 30 before surfaces of the plurality of layers respectively formed immediately before are hardened. By supplying a liquid material for a layer onto a surface of another layer formed immediately before, before at least the surface of the layer formed immediately before is hardened, i.e., in a state that the surface of the layer formed immediately before is in a liquid state, a tightly adhering force between liquid materials at a contacting surface of respective layers of the intermediate transfer belt 10 can be increased. As a result, there is hardly a possibility of separation of the contacting surface of the respective layers of the intermediate transfer belt 10 caused by the load imposed on at the time of rotations of the intermediate transfer belt 10.

As to the rubber and plastic used as materials for the intermediate transfer belt 10, strength and elasticity of polymer are enhanced by vulcanization as it is known. Therefore, by supplying a liquid material of a subsequent layer onto a surface of a preceding layer before the preceding layer is vulcanized (i.e., before hardened), the tightly adhering force between liquid materials at the contacting surface of respective layers of the intermediate transfer belt 10 can be increased as described above.

Figure 13:
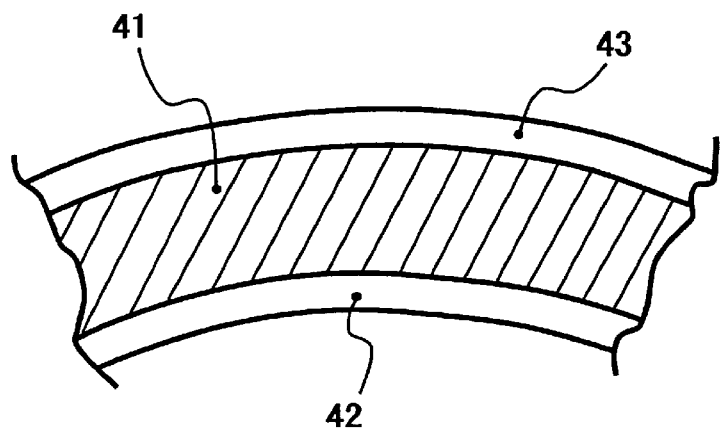
FIG. 13 is an enlarged view illustrating an intermediate transfer belt according to a third embodiment of the present invention.

Hereinafter described is the intermediate transfer belt 10 according to a third embodiment of the present invention. Although the intermediate transfer belt 10 according to the second embodiment of the present invention is formed in a two layer structure including the surface layer 41 and the base layer 42 as illustrated in FIG. 11, the intermediate transfer belt 10 according to the third embodiment of the present invention further has a cover layer 43 on the surface layer 41 as illustrated in FIG. 13.

It is preferable to form the cover layer 43 on the surface layer 41 in the intermediate transfer belt 10. Because by forming the cover layer 43 on the surface layer 41, the surface resistivity of the intermediate transfer belt 10 can be controlled by the cover layer 43, and the volume resistivity of the intermediate transfer belt 10 can be controlled by the surface layer 41 separately. In addition, by covering the surface layer 41, the cover layer 43 serves to prevent substances contained in the material (e.g., elastomer, rubber, etc.) of the surface layer 41 from bleeding from the surface of the surface layer 41 to the surface of the photoreceptor 1. If the surface of the photoreceptor 1 is stained by the substances contained in the material for the surface layer 41, the image deterioration occurs.

Further, it is preferable that each tensile breaking elongation of the cover layer 43, the surface layer 41, and the base layer 42 satisfies the following relations:

$$A>B>C \qquad (1)$$

where A is the tensile breaking elongation of the cover layer 43, B is the tensile breaking elongation of the surface layer 41, and C is the tensile breaking elongation of the base layer 42.

Figure 14:
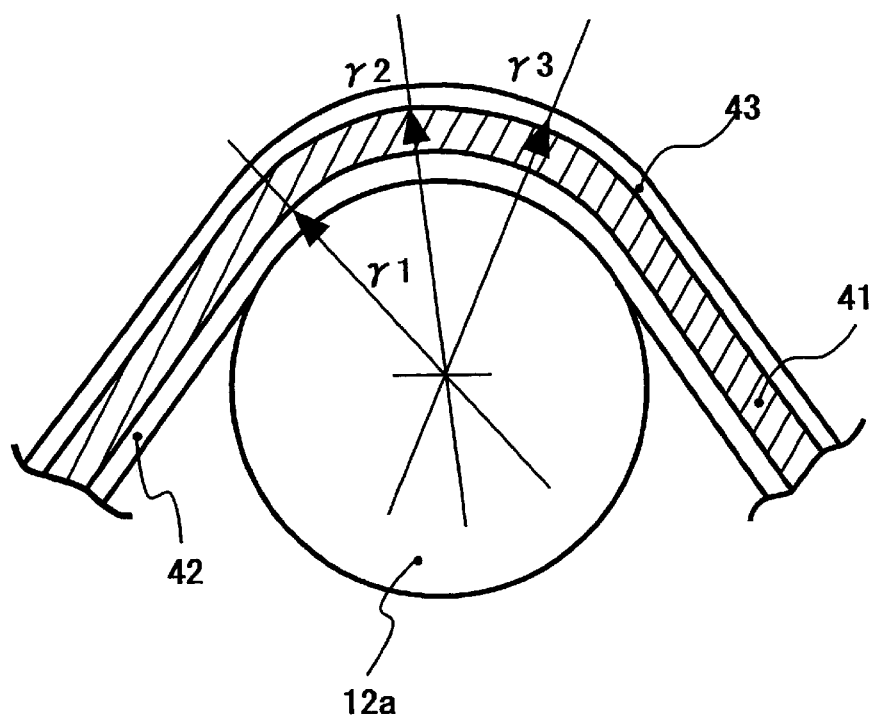
FIG. 14 is a schematic view illustrating a curved portion of the intermediate transfer belt shown in FIG. 13 being spanned around rollers.

As illustrated in FIG. 14, because the intermediate transfer belt 10 is curved while being spanned around the driving roller 13, the driven rollers 12a, 12b, the surface layer 41 and the base layer 42 are expanded at the curved portion of the intermediate transfer belt 10 such that a curvature radius (r2) of the outer surface of the curved portion of the surface layer 41 is greater than a curvature radius (r1) of the outer surface of the curved portion of the base layer 42. Further, the cover layer 43 and the surface layer 41 are expanded at the curved portion of the intermediate transfer belt 10 such that a curvature radius (r3) of the outer surface of the curved portion of the cover layer 43 is greater than the curvature radius (r2) of the outer surface of the curved portion of the surface layer 41.

If the tensile breaking elongation of the cover layer 43 is not greater than that of the surface layer 41, as the intermediate transfer belt 10 repeats rotations, wrinkles and cracks may occur on the surface of the cover layer 43 over time. This may result in image deterioration. If the tensile breaking elongation of the cover layer 43 is not sufficiently greater than that of the surface layer 41, the flexibility of the surface layer 41 can not provide advantage. Unless each tensile breaking elongation of the cover layer 43, the surface layer 41, and the base layer 42 satisfies the above-described relations (1), a follow property of the cover layer 43 to a toner layer deteriorates, i.e., the cover layer 43 can not flexibly deform following concave/convex portions of the toner image formed on the photoreceptor 1. As a result, the transfer blank image is likely to occur at the time of primary transfer.

The cover layer 43 can be formed by the centrifugal molding method in the same manner as in the surface layer 41 and the base layer 42. Alternatively, after the endless belt including the surface layer 41 and the base layer 42 which have been formed by the centrifugal molding method is taken out of the cylindrical mold 30, the cover layer 43 can be formed by applying a material for the cover layer 43 to the surface of the endless belt (i.e., to the surface layer 41). The method of applying the material for the cover layer 43 to the surface layer 41 can be selected from a spray coating method, a brush coating method, a dip coating method, etc.

When the surface layer 41 of 500 μm in thickness was made of urethane rubber whose hardness (JIS-A) was controlled to 45 degrees, the tensile breaking elongation of the surface layer 41 was 250%.

Further, when the base layer 42 of 150 μm in thickness was made of the same polyvinylidene fluoride (PVDF) as used in the base layer 42 according to the second embodiment of the present invention, the tensional modulus of elasticity of the base layer 42 was $10.5\times10^2$ MPa, and the tensile breaking elongation of the base layer 42 was 135%.

Examples of a material for the cover layer 43 include styrene butadience rubber, high styrene rubber, butadience rubber, isoprene rubber, ethylene-propylene copolymers, nitrile-butadien rubber, polychloroprene rubber, butyl rubber, silicone rubber, fluoro rubber, nitrile rubber, urethane rubber, acrylic rubber, epichlorohydrin rubber, norbornene rubber, thermoplastic elastomer, etc.

When the cover layer 43 was made of mixture of 100 parts by weight of polyurethane resin and 120 parts by weight of particulate polytetrafluoroethylene (PTFE) resin such that the thickness thereof was 45 μm, the tensile breaking elongation of the cover layer 43 was 330%.

Hereinafter described is a method of producing the intermediate transfer belt 10 according to the third embodiment of the present invention. First, the cover layer 43 in a shape of endless belt is formed by supplying the above-described material for the cover layer 43 onto the inner peripheral surface of the cylindrical mold 30 rotating at a high speed. Then, an endless belt (i.e., the cover layer 43) is heated and dried so as to be hardened. Subsequently, the above-described material for the surface layer 41 is supplied onto the inner peripheral surface of the endless cover layer 43 which has been formed on the inner peripheral surface of the cylindrical mold 30 rotating at a high speed. Then, an endless belt (i.e., the surface layer 41) is heated and dried so as to be hardened. Subsequently, the above-described material for the base layer 42 is supplied onto the inner peripheral surface of the endless surface layer 41 which has been formed on the inner peripheral surface of the cylindrical mold 30 rotating at a high speed. Then, an endless belt (i.e., the base layer 42) is heated and dried so as to be hardened. Subsequently, the endless belt formed in a three layer structure including the cover layer 43, the surface layer 41, and the base layer 42 is taken out from the cylindrical mold 30, and is cut into the predetermined size.

In the intermediate transfer belt 10 according to the third embodiment of the present invention, four position detecting holes 23 are formed in the same manner as in the first and second embodiments of the present invention. Specifically, as illustrated in FIG. 3, four protruding members 31 are provided on the inner peripheral surface of the cylindrical mold 30 which are equally spaced apart from each other a predetermined distance. By these four protruding members 31, four position detecting holes 23 are formed in the intermediate transfer belt 10 while the liquid materials are being formed into the endless belt. Because a plurality of position detecting holes 23 are formed in the intermediate transfer belt 10, an image forming operation can be performed with reference to one of the position detecting holes 23 which the mark sensor 24 detects first. Therefore, a time taken for an image forming process, i.e., a time taken until printing completion, can be reduced.

Further, by forming the position detecting hole 23 in the intermediate transfer belt 10 while the liquid materials are being formed into the endless belt, the intermediate transfer belt 10 without nonuniformity in the position of the position detecting hole 23 can be obtained.

When image forming operations were performed in the multi-color image forming apparatus including the intermediate transfer belt 10 according to the third embodiment of the present invention, high quality full color images without the transfer unevenness, the deviation of the position of multi-color toner images and the transfer blank image were obtained.

Figure 15:
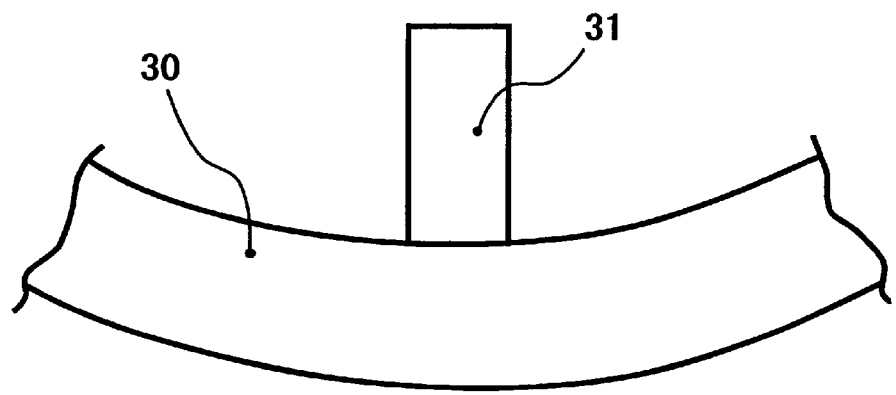
FIG. 15 is a schematic view illustrating a protruding member provided on an inner peripheral surface of a cylindrical mold according to a first comparative example.
Figure 16:
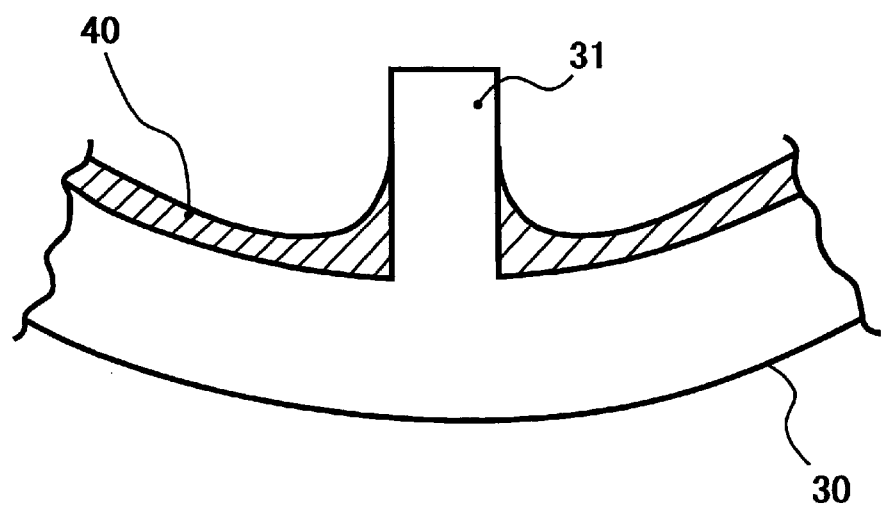
FIG. 16 is a schematic view showing a liquid material being deposited around a bottom part of the protruding member according to the first comparative example.

Next, a first comparative example is described. In the first comparative example, as illustrated in FIG. 15, the protruding member 31 provided on the inner surface of the cylindrical mold 30 is not tapered, but is formed in the shape having constant square measurement of the cross section. Further, a concave portion is not formed at the tip portion of the protruding member 31 and a through hole is not formed through the protruding member 31, but the tip portion of the protruding member 31 is made flat.

Figure 17:
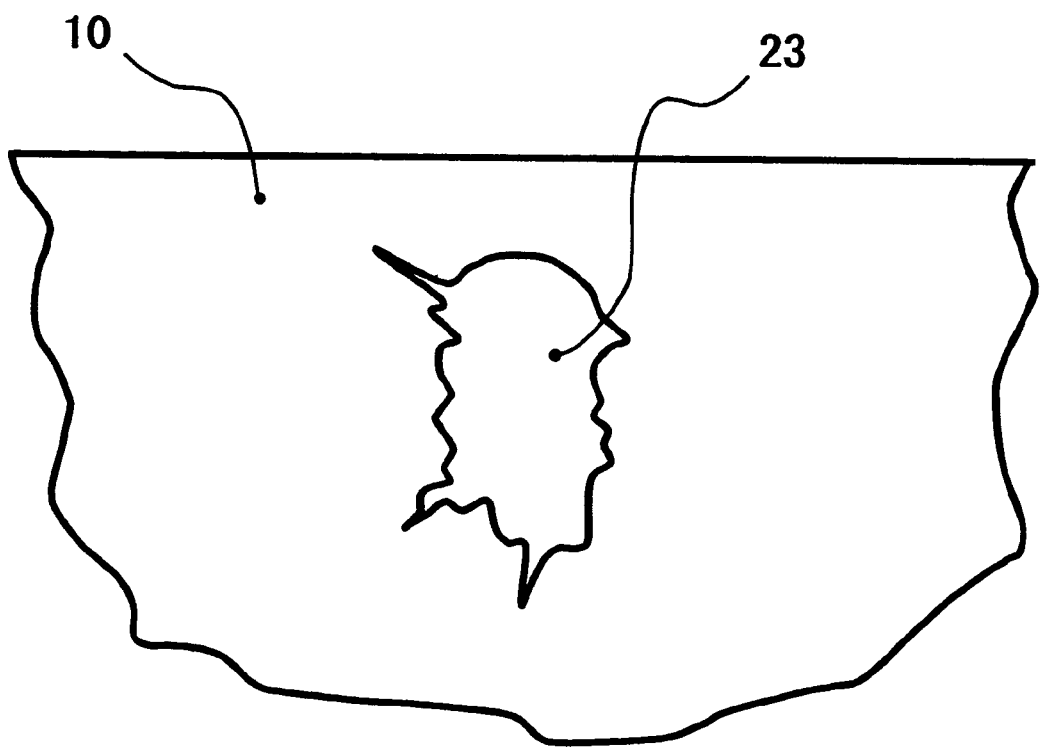
FIG. 17 is an enlarged view illustrating a position detecting hole in an intermediate transfer belt according to the first comparative example.

When the intermediate transfer belt 10 was formed in the cylindrical mold 30 having the above-described protruding member 31 by the centrifugal molding method described in the first embodiment, the liquid material 40 was deposited around the bottom part of the protruding member 31. This made it difficult to take out the intermediate transfer belt 10 from the cylindrical mold 30, causing cracks on the periphery of the position detecting hole 23 as illustrated in FIG. 17.

The intermediate transfer belt 10 obtained in the first comparative example was installed in the multi-color image forming apparatus so as to form images. When about 1,000 images were printed, the intermediate transfer belt 10 was torn from the crack portion of the position detecting hole 23. As a result, further image forming operations could not be carried out.

Figure 18:
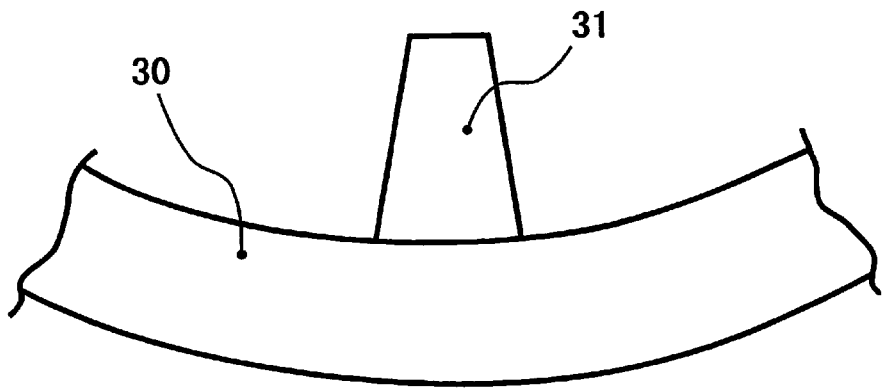
FIG. 18 is a schematic view illustrating a protruding member provided on an inner peripheral surface of a cylindrical mold according to a second comparative example.

Next, a second comparative example is described. In the second comparative example, as illustrated in FIG. 18, the protruding member 31 provided on the inner surface of the cylindrical mold 30 is tapered in the same manner as in the first embodiment of the present invention. However, the tip portion of the protruding member 31 is made flat without a concave portion and a through hole.

Figure 19:
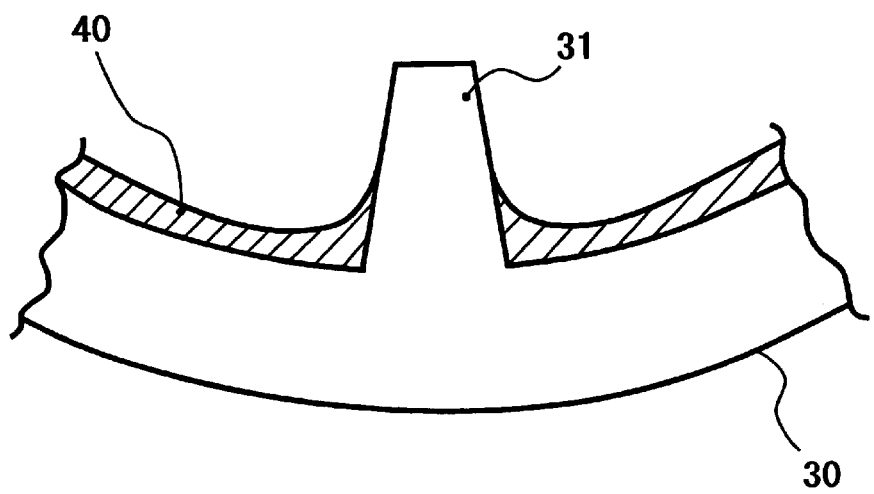
FIG. 19 is a schematic view showing a liquid material being deposited around a bottom part of the protruding member according to the second comparative example.
Figure 20:
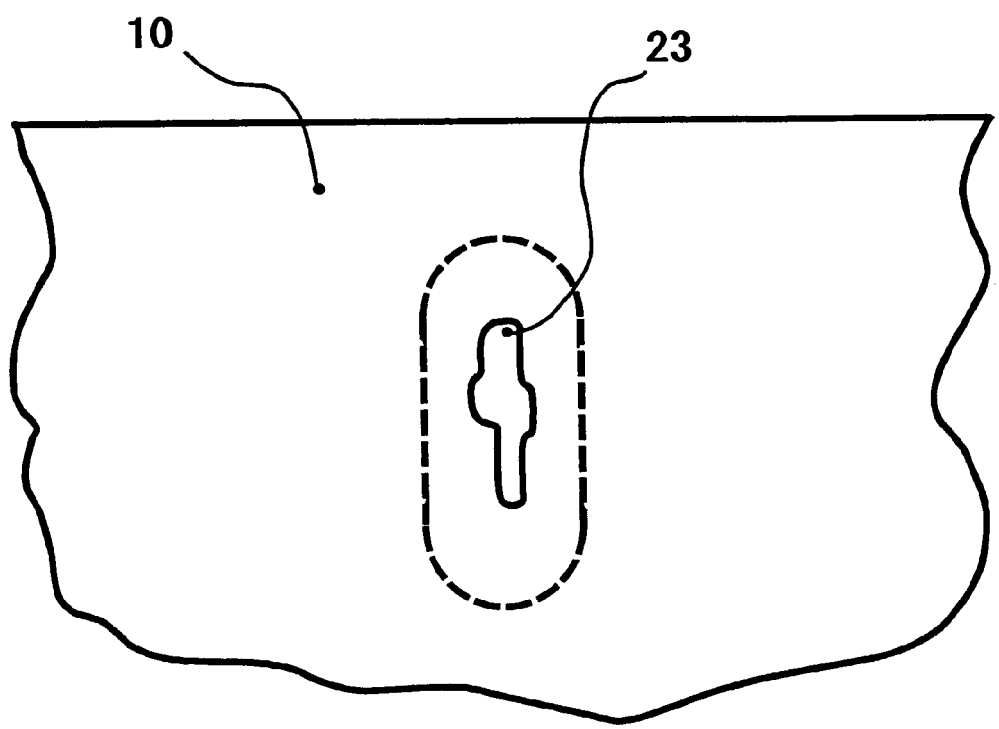
FIG. 20 is an enlarged view illustrating a position detecting hole in an intermediate transfer belt according to the second comparative example.

When the intermediate transfer belt 10 was formed in the cylindrical mold 30 having the above-described protruding member 31 by the centrifugal molding method described in the first embodiment, as illustrated in FIG. 19, the liquid material 40 was deposited around the bottom part of the protruding member 31 similarly as in the first comparative example. Although the intermediate transfer belt 10 could be relatively easily taken out from the cylindrical mold 30, the position detecting hole 23 was partly closed by the resin deposited on the periphery of the position detecting hole 23 as illustrated in FIG. 20.

When image forming operations were performed in the multi-color image forming apparatus including the above-described intermediate transfer belt 10 obtained in the second comparative example, the position of the intermediate transfer belt 10 could not be detected by the mark sensor 24. As a result, the image formation could not have been achieved.

Next, a third comparative example is described. In the third comparative example, the conditions of the intermediate transfer belt 10 were the same as in the third embodiment of the present invention except that the mixture of 100 parts by weight of acrylic rubber and 20 parts by weight of carbon for reinforcement was used as the material for the base layer 42 of the intermediate transfer belt 10. The tensional modulus of elasticity of the base layer 42 according to the third comparative example was $1.5 \times 10^2$ MPa.

When image forming operations were performed in the multi-color image forming apparatus including the above-described intermediate transfer belt 10 obtained in the third comparative example, although the transfer unevenness and the transfer blank image did not occur, the deviation of the position of multi-color toner images due to the expansion of the base layer 42 of the intermediate transfer belt 10 occurred.

Next, a fourth comparative example is described. In the fourth comparative example, the conditions of the intermediate transfer belt 10 were the same as in the third embodiment of the present invention except that polyimide was used as the material for the base layer 42 of the intermediate transfer belt 10.

A method of producing the intermediate transfer belt 10 according to the fourth comparative example is described as follows. First, a material for the cover layer 43 was supplied onto the inner peripheral surface of the cylindrical mold 30 while being rotated at a high speed, and was heated. Subsequently, a material for the surface layer 41 was supplied onto the inner peripheral surface of the half-hardened cover layer 43 while the cylindrical mold 30 was being rotated, and was heated. Subsequently, a mixture wherein carbon black was added to a polyimide varnish (heat-resistant polyimide varnish dissolved in N-methylpyrrolidone as a solvent; U Varnish-S, produced by Ube Industries, Ltd.) in an amount of 16 parts by weight based on 100 parts by weight of a resin component was used as a material for the base layer 42 and supplied onto the inner peripheral surface of the half-hardened surface layer 41 while the cylindrical mold 30 was being rotated. The endless belt was dried in a 70° C. hot air for 40 minutes. Subsequently, under the condition that the rotations of the cylindrical mold 30 were stopped, the endless belt was heated from 70° C. to 100° C. in 30 minutes such that the solvent was evaporated. The endless belt was then heated to a temperature of 180° C. for 45 minutes so that polyamidic acid was subjected to dehydro-condensation to undergo full hardening. Subsequently, the endless belt was taken out from the cylindrical mold 30, and was cut into a predetermined size.

Similarly as the intermediate transfer belt 10 according to the third embodiment of the present invention, four protruding members 31 were provided with equally spaced apart from each other at a predetermined distance on the inner peripheral surface of the cylindrical mold 30 in the fourth comparative example.

Although polyamide is usually subjected to dehydro-condensation at a temperature from 300° C. to 400° C., the polyamidic acid was subjected to dehydro-condensation at the temperature of 180° C. in the fourth comparative example because the cover layer 43 and the surface layer 41 were heat-resistant at 200° C. or less. In the fourth comparative example, the tensional modulus of elasticity of the base layer 42 was $3.2 \times 10^5$ MPa, and the tensile breaking elongation of the base layer 42 was about 101%.

When image forming operations were performed in the multi-color image forming apparatus including the above-described intermediate transfer belt 10 obtained in the fourth comparative example, although the transfer unevenness and the transfer blank image did not occur, the deviation of the position of multi-color toner images due to the slip of the intermediate transfer belt 10 at the driving roller 13 occurred from the beginning.

In order to avoid the above-described deviation of the position of multi-color toner images, a tension applied to the intermediate transfer belt 10 was set to about double in the fourth comparative example greater than that applied to the intermediate transfer belt 10 in the third embodiment of the present invention. Consequently, the deviation of the position of multi-color toner images due to the slip of the intermediate transfer belt 10 at the driving roller 13 did not occur. However, when about 10,000 images were printed, the intermediate transfer belt 10 was torn from the edge portion thereof. As a result, further image forming operations could not have been carried out.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A method of producing an endless intermediate transfer belt having at least one position detecting hole for detecting a rotational position of the endless intermediate transfer belt in an image forming apparatus, comprising the steps of:
   rotating a cylindrical mold having at least one protruding member on an inner peripheral surface thereof;
   supplying a liquid material onto the inner peripheral surface of the cylindrical mold wherein the liquid material is formed into the endless intermediate transfer belt and the at least one position detecting hole is formed in the endless intermediate transfer belt by the at least one protruding member;
   heating the endless intermediate transfer belt so as to harden the endless intermediate transfer belt; and
   taking out the endless intermediate transfer belt from the cylindrical mold.

2. The method according to claim 1, wherein the at least one protruding member is tapered toward a rotational center of the cylindrical mold such that the at least one position detecting hole is not damaged when the endless intermediate transfer belt is taken out of the cylindrical mold.

3. The method according to claim 1, wherein the at least one protruding member has a tip portion and a concave portion at the tip portion such that the liquid material adhered to the tip portion of the protruding member is deposited in the concave portion.

4. The method according to claim 1, wherein the at least one protruding member has a tip portion and a through hole such that the liquid material adhered to the tip portion is discharged from the cylindrical mold through the through hole.

5. The method according to claim 1, wherein the at least one protruding member has a cross section which is one of circular, elliptic, square and rectangular shapes such that the at least one position detecting hole is formed into the one of circular, elliptic, square and rectangular shapes.

6. The method according to claim 1, wherein:
   the at least one protruding member has a cross section which is one of an elliptic shape and a r ectangular shape; and
   the cross section of the at least one protruding member extends in a width direction of the endless intermediate transfer belt such that the at least one position detecting hole is formed into one of an elliptic shape and a rectangular shape which extends in the width direction of the endless intermediate transfer belt.

7. The method according to claim 1, further comprising applying a mold release agent to the at least one protruding member before supplying the liquid material onto the inner peripheral surface of the cylindrical mold.

8. The method according to claim 1, wherein:
   the endless intermediate transfer belt comprises a plurality of layers including at least a surface layer and a base layer;
   the supplying step comprises supplying a plurality of liquid materials including at least a first liquid material for forming the surface layer and a last liquid material for forming the base layer onto the inner peripheral surface of the cylindrical mold so as to form the endless intermediate transfer belt having the plurality of layers while the at least one position detecting hole is being formed in the endless intermediate transfer belt by the at least one protruding member;
   the plurality of liquid materials forms respective layers of the endless intermediate transfer belt having the plurality of layers; and
   the first liquid material for forming the surface layer is supplied first, and the last liquid material for forming the base layer is supplied last.

9. The method according to claim 8, wherein the supplying step comprises supplying each liquid material of the plurality of liquid materials respectively onto the inner peripheral surface of the cylindrical mold before a surface of a respective one of the plurality of layers formed immediately before is hardened.

10. The method according to claim 8, wherein:
    the surface layer has a hardness in a range of 10 degrees to 90 degrees in JIS-A of Japanese Industrial Standards; and
    the base layer has a tensional modulus of elasticity in a range of $2\times10^2$ MPa to $3\times10^5$ MPa in JIS K7133 of Japanese Industrial Standards.

11. The method according to claim 8, wherein:
    the surface layer has a hardness in a range of 20 degrees to 80 degrees in JIS-A of Japanese Industrial Standards; and
    the base layer has a tensional modulus of elasticity in a range of $6\times10^2$ MPa to $3\times10^5$ MPa in JIS K7133 of Japanese Industrial Standards.

12. The method according to claim 8, wherein:
    the surface layer has a hardness in a range of 30 degrees to 70 degrees in JIS-A of Japanese Industrial Standards; and
    the base layer has a tensional modulus of elasticity in a range of $8.5\times10^2$ MPa to $3\times10^5$ MPa in JIS K7133 of Japanese Industrial Standards.

13. The method according to claim 8, wherein:
    the base layer has a tensile breaking elongation of 102% or greater in JIS K6301 of Japanese Industrial Standards;
    the surface layer comprises a cover layer formed on a surface thereof; and
    the cover layer, the surface layer and the base layer each have a tensile breaking elongation which satisfies a relationship, $A>B>C$, where A is the tensile breaking elongation of the cover layer, B is the tensile breaking elongation of the surface layer, and C is the tensile breaking elongation of the base layer.

14. An intermediate transfer belt produced by the method according to claim 1.

15. The intermediate transfer belt according to claim 14, wherein the at least one position detecting hole has one of circular, elliptic, square and rectangular shapes.

16. The intermediate transfer belt according to claim 14, wherein:
    the at least one position detecting hole has one of an elliptic shape and a rectangular shape; and
    the at least one position detecting hole extends in a width direction of the intermediate transfer belt.

17. The intermediate transfer belt according to claim 14, comprising a plurality of layers including at least a surface layer and a base layer,
    wherein the surface layer has a hardness in a range of 10 degrees to 90 degrees in JIS-A of Japanese Industrial Standards, and the base layer has a tensional modulus of elasticity in a range of $2 \times 10^2$ MPa to $3 \times 10^5$ MPa in JIS K7133 of Japanese Industrial Standards.

18. The intermediate transfer belt according to claim 14, comprising a plurality of layers including at least a surface layer and a base layer, wherein the surface layer has a hardness in a range of 20 degrees to 80 degrees in JIS-A of Japanese Industrial Standards, and the base layer has a tensional modulus of elasticity in a range of $6 \times 10^2$ MPa to $3 \times 10^5$ MPa in JIS K7133 of Japanese Industrial Standards.

19. The intermediate transfer belt according to claim 14, comprising a plurality of layers including at least a surface layer and a base layer, wherein the surface layer has a hardness in a range of 30 degrees to 70 degrees in JIS-A of Japanese Industrial Standards, and the base layer has a tensional modulus of elasticity in a range of $8.5 \times 10^2$ MPa to $3 \times 10^5$ MPa in JIS K7133 of Japanese Industrial Standards.

20. The intermediate transfer belt according to claim 17, further comprising a cover layer formed on a surface of the surface layer, wherein the base layer has a tensile breaking elongation of 102% or greater in JIS K6301 of Japanese Industrial Standards, and the cover layer, the surface layer and the base layer each have a tensile breaking elongation which satisfies a relationship, $$A > B > C,$$

where A is the tensile breaking elongation of the cover layer, B is the tensile breaking elongation of the surface layer, and C is the tensile breaking elongation of the base layer.

21. The intermediate transfer belt according to claim 18, further comprising a cover layer formed on a surface of the surface layer, wherein the base layer has a tensile breaking elongation of 102% or greater in JIS K6301 of Japanese Industrial Standards, and the cover layer, the surface layer and the base layer each have a tensile breaking elongation which satisfies a relationship, $$A > B > C,$$

where A is the tensile breaking elongation of the cover layer, B is the tensile breaking elongation of the surface layer, and C is the tensile breaking elongation of the base layer.

22. The intermediate transfer belt according to claim 19, further comprising a cover layer formed on a surface of the surface layer, wherein the base layer has a tensile breaking elongation of 102% or greater in JIS K6301 of Japanese Industrial Standards, and the cover layer, the surface layer and the base layer each have a tensile breaking elongation which satisfies a relationship, $$A > B > C,$$

where A is the tensile breaking elongation of the cover layer, B is the tensile breaking elongation of the surface layer, and C is the tensile breaking elongation of the base layer.

23. An image forming apparatus comprising an intermediate transfer belt produced by the method according to claim 1.

24. The image forming apparatus according to claim 23, wherein the at least one position detecting hole of the intermediate transfer belt has one of circular, elliptic, square and rectangular shapes.

25. The image forming apparatus according to claim 23, wherein:

the at least one position detecting hole of the intermediate transfer belt has one of an elliptic shape and a rectangular shape; and the at least one position detecting hole extends in a width direction of the intermediate transfer belt.

26. The image forming apparatus according to claim 23, wherein:

the intermediate transfer belt comprises a plurality of layers including at least a surface layer and a base layer;

the surface layer has a hardness in a range of 10 degrees to 90 degrees in JIS-A of Japanese Industrial Standards; and the base layer has a tensional modulus of elasticity in a range of $2 \times 10^2$ MPa to $3 \times 10^5$ MPa in JIS K7133 of Japanese Industrial Standards.

27. The image forming apparatus according to claim 23, wherein:

the intermediate transfer belt comprises a plurality of layers including at least a surface layer and a base layer;

the surface layer has a hardness in a range of 20 degrees to 80 degrees in JIS-A of Japanese Industrial Standards; and the base layer has a tensional modulus of elasticity in a range of $6 \times 10^2$ MPa to $3 \times 10^5$ MPa in JIS K7133 of Japanese Industrial Standards.

28. The image forming apparatus according to claim 23, wherein:

the intermediate transfer belt comprises a plurality of layers including at least a surface layer and a base layer;

the surface layer has a hardness in a range of 30 degrees to 70 degrees in JIS-A of Japanese Industrial Standards; and the base layer has a tensional modulus of elasticity in a range of $8.5 \times 10^2$ MPa to $3 \times 10^5$ MPa in JIS K7133 of Japanese Industrial Standards.

29. The image forming apparatus according to claim 26, wherein:

the intermediate transfer belt further comprises a cover layer formed on a surface of the surface layer;

the base layer has a tensile breaking elongation of 102% or greater in JIS K6301 of Japanese Industrial Standards; and the cover layer, the surface layer and the base layer each have a tensile breaking elongation which satisfies a relationship, $$A > B > C,$$

where A is the tensile breaking elongation of the cover layer, B is the tensile breaking elongation of the surface layer, and C is the tensile breaking elongation of the base layer.

30. The image forming apparatus according to claim 27, wherein:

the intermediate transfer belt further comprises a cover layer formed on a surface of the surface layer;

the base layer has a tensile breaking elongation of 102% or greater in JIS K6301 of Japanese Industrial Standards; and the cover layer, the surface layer and the base layer each have a tensile breaking elongation which satisfies a relationship, $$A>B>C,$$

where A is the tensile breaking elongation of the cover layer, B is the tensile breaking elongation of the surface layer, and C is the tensile breaking elongation of the base layer.

31. The image forming apparatus according to claim 28, wherein:

the intermediate transfer belt further comprises a cover layer formed on a surface of the surface layer;

the base layer has a tensile breaking elongation of 102% and greater in JIS K6301 of Japanese Industrial Standards; and the cover layer, the surface layer and the base layer each have a tensile breaking elongation which satisfies a relationship, $$A>B>C,$$

where A is the tensile breaking elongation of the cover layer, B is the tensile breaking elongation of the surface layer, and C is the tensile breaking elongation of the base layer.

* * * * *